(12) United States Patent
Lee et al.

(10) Patent No.: US 12,511,501 B2
(45) Date of Patent: Dec. 30, 2025

(54) TRANSLITERATED SEARCH METHOD AND ELECTRONIC DEVICE SUPPORTING SAME

(71) Applicant: Samsung Electronics Co., Ltd., Suwon-si (KR)

(72) Inventors: Jeongpyo Lee, Suwon-si (KR); Namgyu Kim, Suwon-si (KR); Balabhaskar Veerannagari, Karnataka (IN); Hemant Tiwari, Karnataka (IN); Mukund Rungta, Karnataka (IN); Surendra Kumar Kanisetty, Karnataka (IN); Vanraj Vala, Karnataka (IN); Jungmin Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 393 days.

(21) Appl. No.: 18/105,197

(22) Filed: Feb. 2, 2023

(65) Prior Publication Data

US 2023/0186037 A1    Jun. 15, 2023

Related U.S. Application Data

(63) Continuation of application No. PCT/KR2021/010049, filed on Aug. 2, 2021.

(30) Foreign Application Priority Data

Aug. 4, 2020   (KR) .......................... 10-2020-0097649

(51) Int. Cl.
*G06F 40/58* (2020.01)
*G06F 16/3332* (2025.01)
(Continued)

(52) U.S. Cl.
CPC .......... *G06F 40/58* (2020.01); *G06F 16/3337* (2019.01); *G06F 40/242* (2020.01);
(Continued)

(58) Field of Classification Search
CPC ...... G06F 40/58; G06F 40/242; G06F 40/284; G06F 40/237; G06F 40/274; G06F 40/45;
(Continued)

(56) References Cited

U.S. PATENT DOCUMENTS 6,411,932 B1 *   6/2002   Molnar ................... G10L 13/00
                                                            704/254
8,275,600 B2     9/2012   Bilac et al.
(Continued)

FOREIGN PATENT DOCUMENTS

CN        109101630 A       12/2018
JP        2007538278 A      12/2007
(Continued)

OTHER PUBLICATIONS

International Search Report and Written Opinion for International Application No. PCT/KR2021/010049; International Filing Date Aug. 2, 2021; Date of Mailing Nov. 16, 2021; 61 Pages.

*Primary Examiner* — Anne L Thomas-Homescu
(74) *Attorney, Agent, or Firm* — CANTOR COLBURN LLP

(57) ABSTRACT

An electronic device includes a processor and a memory to store a dictionary and index information. The memory can store instructions to cause the processor to: extract a first text in a first language included in data; determine whether or not a transliteration pair is included in the dictionary; if the transliteration pair is identified, index the first text and at least one second text to the data and store same in the index information; and, if the transliteration pair is not identified, extract at least one third text in the second language by inputting the extracted first text to a machine learning model for transliterating an input in the first language into the second language and extracting same, and index the first text (Continued)

and the at least one third text which has been extracted to the data and store same in the index information.

20 Claims, 12 Drawing Sheets

(51) Int. Cl.
    *G06F 40/242* (2020.01)
    *G06F 40/284* (2020.01)
    *G06N 3/045* (2023.01)
    *G06N 3/08* (2023.01)
(52) U.S. Cl.
    CPC ........... *G06F 40/284* (2020.01); *G06N 3/045* (2023.01); *G06N 3/08* (2013.01)
(58) Field of Classification Search
    CPC ............... G06F 40/247; G06F 16/3337; G06F 16/3344; G06F 16/338
    See application file for complete search history.

(56) References Cited

U.S. PATENT DOCUMENTS

| | | | | |
|---|---|---|---|---|
| 8,521,761 B2* | 8/2013 | Katragadda | ........... | G06F 16/951 707/760 |
| 8,554,537 B2* | 10/2013 | Rai | ........... | G06F 40/53 704/8 |
| 9,098,488 B2* | 8/2015 | Hamid | ........... | G06F 40/58 |
| 9,342,503 B1* | 5/2016 | Evans | ........... | G06F 16/3337 |
| 10,133,737 B2* | 11/2018 | Brawer | ........... | G06F 40/129 |
| 10,185,710 B2* | 1/2019 | Egi | ........... | G06F 40/53 |
| 10,510,340 B1* | 12/2019 | Fu | ........... | G10L 15/18 |
| 11,120,064 B2 | 9/2021 | Ash | | |
| 2007/0156405 A1 | 7/2007 | Schulz et al. | | |
| 2008/0221866 A1* | 9/2008 | Katragadda | ........... | G06F 40/45 704/8 |
| 2008/0270111 A1* | 10/2008 | Hanumanthappa | ... | G06F 40/151 704/3 |
| 2009/0037403 A1* | 2/2009 | Joy | ........... | G06F 16/9537 707/999.005 |
| 2009/0070095 A1* | 3/2009 | Gao | ........... | G06F 40/45 704/2 |
| 2009/0125477 A1* | 5/2009 | Lu | ........... | G06F 16/3343 |
| 2009/0319257 A1* | 12/2009 | Blume | ........... | G06F 40/55 704/7 |
| 2009/0326914 A1* | 12/2009 | Joy | ........... | G06F 40/129 704/3 |
| 2010/0017382 A1* | 1/2010 | Katragadda | ........... | G06F 16/951 707/E17.074 |
| 2010/0094614 A1* | 4/2010 | Bilac | ........... | G06F 40/53 704/2 |
| 2010/0185670 A1* | 7/2010 | Krishnan | ........... | G06F 16/3335 704/8 |
| 2011/0099000 A1* | 4/2011 | Rai | ........... | G06F 40/129 704/2 |
| 2011/0184723 A1* | 7/2011 | Huang | ........... | G09B 5/062 704/8 |
| 2013/0338996 A1* | 12/2013 | Katragadda | ........... | G06F 16/951 704/2 |
| 2014/0095143 A1* | 4/2014 | Jan | ........... | G06F 40/129 704/2 |
| 2017/0374093 A1* | 12/2017 | Dhar | ........... | G06Q 50/265 |
| 2018/0173689 A1* | 6/2018 | Pino | ........... | G06F 40/44 |
| 2019/0332662 A1* | 10/2019 | Middendorf | ........... | G06F 16/93 |
| 2020/0159857 A1* | 5/2020 | Ash | ........... | G06F 16/3337 |
| 2020/0211416 A1* | 7/2020 | Upadhyay | ........... | G06N 20/00 |

FOREIGN PATENT DOCUMENTS

| | | |
|---|---|---|
| JP | 6044996 B2 | 12/2016 |
| KR | 20010037652 A | 5/2001 |
| KR | 20050023942 A | 3/2005 |
| KR | 100542757 B1 | 1/2006 |
| KR | 20090042201 A | 4/2009 |
| KR | 20110083623 A | 7/2011 |
| KR | 101116581 B1 | 3/2012 |
| KR | 20140018836 A | 2/2014 |
| KR | 101753395 B1 | 7/2017 |

* cited by examiner

TRANSLITERATED SEARCH METHOD AND ELECTRONIC DEVICE SUPPORTING SAME

CROSS-REFERENCE TO RELATED APPLICATION(S

This application is a continuation application, claiming priority under § 365(c), of International Application No. PCT/KR2021/010049, filed on Aug. 2, 2021, which is based on and claims the benefit of Korean patent application number 10-2020-0097649, filed on Aug. 4, 2020, in the Korean Intellectual Property Office, the disclosures of which are incorporated by reference herein in their entireties.

TECHNICAL FIELD

Various embodiments disclosed in this specification relate to a technology for a transliterated search method and an electronic device supporting the same.

BACKGROUND ART

An electronic device may search for data based on a text corresponding to a user input (e.g., a voice input or a touch input). The electronic device may support intelligent search by transmitting a user input entered into the electronic device to an intelligent server connected to the electronic device through communication, and providing a user with found results received from the intelligent server through a user interface. Alternatively, the electronic device may support intelligent search by performing a search operation only within the electronic device based on an artificial intelligence model stored in the electronic device without going through the server and providing found results.

The electronic device may extract at least one text included in data stored in the electronic device and then may store index information indexed in the data. Accordingly, the electronic device may quickly search for data, which the user wants, based on the index information when performing a search operation.

DISCLOSURE

Technical Problem

A conventional electronic device may not support a transliterated search for an address name, an application ("app") name, or a contact name, which is written in other languages, or may support a transliterated search only based on a limited synonym dictionary. Accordingly, the conventional electronic device may fail to perform the transliterated search for words that are not in a synonym dictionary.

Moreover, an electronic device may utilize an artificial intelligence model to perform transliteration on words that are not present in a dictionary. For example, when the electronic device is a portable electronic device such as a smart phone, tablet personal computer (PC), or wearable device, the electronic device has limited resources (e.g., CPU or memory). Accordingly, the size and latency of the artificial intelligence model may need to be reduced to operate an artificial intelligence model within the electronic device.

Technical Solution

According to an embodiment disclosed in the specification, an electronic device may include at least one processor and a memory operatively connected to the at least one processor and storing a dictionary and index information. The memory may store one or more instructions that, when executed, cause the at least one processor to extract a first text in a first language included in data stored in the memory, to determine whether a transliteration pair including the extracted first text and at least one second text in a second language corresponding to the extracted first text is included in the dictionary, in response to identifying the transliteration pair in the dictionary, to index the first text and the at least one second text into the data to be stored in the index information, and, in responsive to the transliteration pair not being identified, to output at least one third text in the second language by inputting the extracted first text into to a machine learning model, which transliterates an input in the first language into the second language so as to be outputs, and to index the first text and the output at least one third text into the data so as to be stored in the index information.

Moreover, according to an embodiment disclosed in the specification, a method for transliterated search of an electronic device may include extracting a first text in the first language included in data stored in a memory of the electronic device, determining whether a transliteration pair including the extracted first text and at least one second text in a second language corresponding to the extracted first text is included in a dictionary, in response to identifying the transliteration pair in the dictionary in the dictionary, indexing the first text and the at least one second text into the data so as to be stored in index information as identifying the transliteration pair, and, in response to the transliteration pair not being identified in the dictionary, outputting at least one third text in the second language by inputting the extracted first text into to a machine learning model and indexing the first text and the output at least one third text into the data so as to be stored in the index information as the transliteration pair is not identified.

Advantageous Effects

According to various embodiments disclosed in the specification, an electronic device may perform a transliterated search even for a word that is not present in a synonym dictionary.

Moreover, according to various embodiments disclosed in the specification, an electronic device may provide an intelligent transliterated search based on an artificial intelligence model.

Besides, a variety of effects directly or indirectly understood through the specification may be provided.

With regard to description of drawings, the same or similar components will be marked by the same or similar reference signs.

MODE FOR INVENTION

Figure 1:
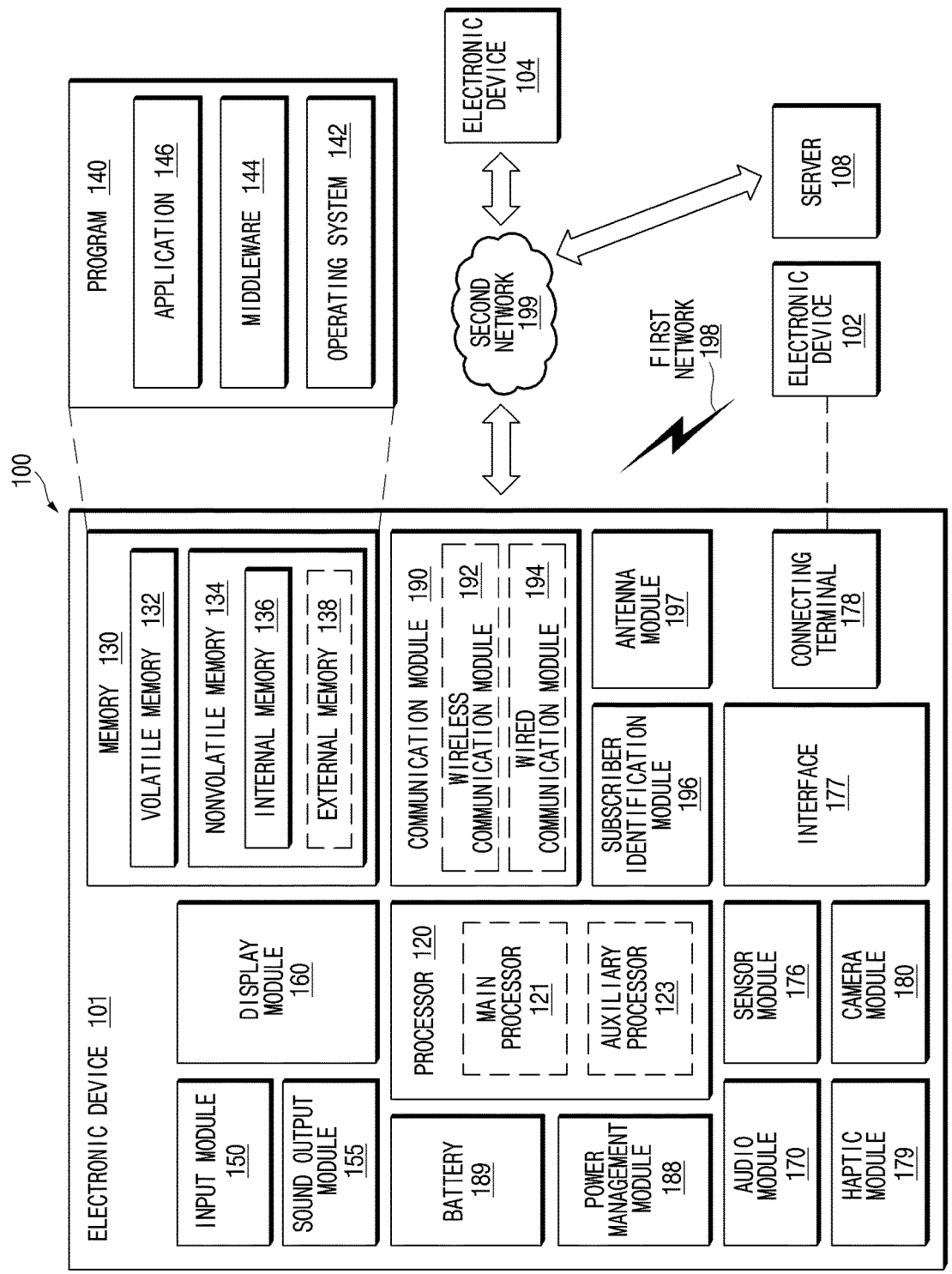
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, components and operations of an electronic device according to an embodiment will be described with reference to FIG. 2.

Figure 2:
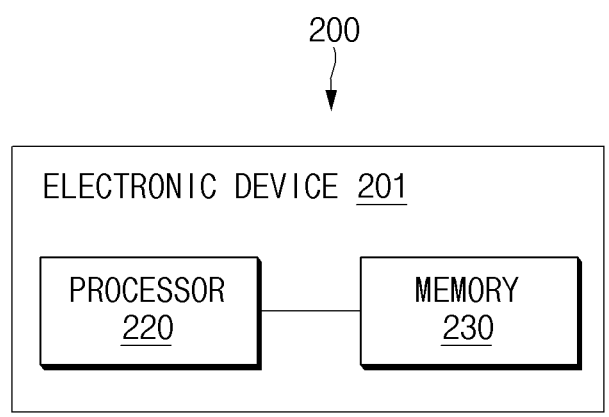
FIG. 2 is a block diagram of the electronic device according to an embodiment.

FIG. 2 is a block diagram 200 of an electronic device, according to an embodiment.

Referring to FIG. 2, an electronic device 201 (e.g., the electronic device 101 of FIG. 1) may include a processor 220 (e.g., the processor 120 of FIG. 1), and a memory 230 (e.g., the memory 130 of FIG. 1). According to an embodiment, the processor 120 may be operatively connected with the memory 230. According to an embodiment, the memory 230 may store one or more instructions executable by the processor 220.

According to an embodiment, the processor 220 may extract at least one text included in data stored in the memory 230. According to an embodiment, the data stored in the memory 230 may include various types of information used in various applications (e.g., a gallery application, a contact application, a finder application, or a note application) such as photos, videos, contacts, applications, or documents. According to an embodiment, at least one text included in the data may indicate data or may mean information composed of characters representing the data. According to an embodiment, the processor 220 may extract at least one text, which indicates data or represents the data, from the data. For example, when the data corresponds to an application, the processor 220 may extract at least one of the application's title, English title, package name, or category name; when the data corresponds to a photo or video, the processor 220 may extract a text such as a file name of the photo or video, an address of a location where the photo or video was taken; and when the data corresponds to contacts, the processor 220 may extract a text such as the name of a contact subject or company name.

According to an embodiment, the processor 220 may index the text, which is extracted from data, into the data. The indexing may refer to an operation of storing an index referenced when the processor 220 searches for data. The processor 220 may search for data to be found by using index information without identifying all data stored in a database.

According to an embodiment, the processor 220 may pre-process the text. According to an embodiment, the processor 220 may tokenize the text. For example, the processor 220 may tokenize the text into a plurality of texts based on a white space. For another example, when the text is composed of compound words, the processor 220 may tokenize the text into a plurality of texts based on a language change. According to an embodiment, the processor 220 may organize the text. For example, the processor 220 may remove invalid special characters from the text, may remove stop words, or may normalize an accent.

According to an embodiment, the processor 220 may pre-process a text for indexing the text extracted from data into the data, but is not limited thereto. For example, the processor 220 may pre-process a keyword for data search. According to an embodiment, the processor 220 may index the pre-processed text into data.

According to an embodiment, the processor 220 may receive a user input including a keyword for searching for data, and the user input may be input in a language different from the language of the text extracted from data. For example, the text extracted from data may be in a first language (e.g., English) and the user input may be input in a second language (e.g., Korean). According to an embodiment, the language of the text extracted from the data may be different from the language of the keyword entered by a user of the electronic device to search for the data. For example, the user input for data search received by the processor 220 may include a keyword obtained by transliterating a text in a first language extracted from data into a second language.

According to an embodiment, the processor 220 may index the text, which is obtained by transliterating the text extracted from data, into the data. According to an embodiment, the processor 220 may index the text, which is obtained by transliterating the text extracted from data by using a machine learning model, into the data. According to an embodiment, the machine learning model may be stored in the memory 230, but is not limited thereto. For example, the machine learning model may be stored in an external electronic device (e.g., the server 108). According to an embodiment, the processor 220 may output a text transliterated in a second language by inputting a text in a first language into the machine learning model. Here, the first language may be a language of a text extracted from the data. The second language may be one of one or more languages supported by the electronic device 201, and may be a language different from the first language.

According to an embodiment, the processor 220 may identify a text, which is obtained by transliterating the text extracted from the data, based on a transliteration pair table stored in the memory 230. For example, the memory 230 may store the transliteration pair table including a text in a first language and at least one text transliterated in a second language different from the first language. In various embodiments of the disclosure, the transliteration pair table may be referred to as a "dictionary."

According to an embodiment, the dictionary may include a transliteration pair table including an abbreviation and a transliteration for the abbreviation. In various embodiments of the disclosure, the transliteration pair table including an abbreviation and a transliteration for the abbreviation may be referred to as a "transliteration dictionary." According to an embodiment, the dictionary may include the transliteration pair table including a text, which is frequently used (e.g., having a high search frequency or redundancy) or is expected to be used frequently (e.g., having a high search frequency), and the inference result (e.g., output) of the machine learning model by using the text as an input. In various embodiments of the disclosure, the transliteration pair table including an input/output of the machine learning model may be referred to as a "caching dictionary." According to an embodiment, the processor 220 may recognize the caching dictionary by distinguishing the caching dictionary from the transliteration dictionary.

According to an embodiment, the processor 220 may determine whether a transliteration pair including a first text in a first language, which is extracted from data, and at least one second text in a second language corresponding to the first text is included in a dictionary (e.g., a transliteration dictionary or caching dictionary). According to an embodiment, when identifying the transliteration pair, the processor 220 may identify at least one second text obtained by transliterating the first text extracted from data.

According to an embodiment, the processor 220 may index at least one second text, which is obtained by transliterating the first text extracted from the identified data, into the data based on a transliteration pair stored in a dictionary (e.g., a transliteration dictionary or caching dictionary). According to an embodiment, responsive to determining that the transliteration pair corresponding to the first text extracted from data is included in a dictionary (e.g., a transliteration dictionary or caching dictionary), the processor 220 may identify at least one second text, which is obtained by transliterating the first text, and may index the at least one second text into the data. For example, when identifying at least one second text, which is obtained by transliterating the first text, based on a dictionary, the processor 220 may or may not perform an inference operation of the machine learning model.

According to an embodiment, the processor 220 may index the first text and the at least one second text into the data by identifying a transliteration pair including the first text in a first language, which is extracted from data, and the at least one second text in a second language corresponding to the first text in a dictionary (e.g., a transliteration dictionary or caching dictionary).

According to an embodiment, as the transliteration pair including the first text and the at least one second text is not identified in a dictionary (e.g., a transliteration dictionary or caching dictionary), the processor 220 may input the first text into the machine learning model to output at least one third text in a second language, and may index the first text and the at least one third text to the data.

For example, the second language may be Korean, and the at least one third text in the second language may include a plurality of Korean alphabets. According to an embodiment, the at least one third text output from the machine learning model may be in a state where the plurality of Korean alphabets are separated from one another. According to an embodiment, the processor 220 may index text, which is obtained by combining separated Korean alphabets included in the at least one third text, into data. For example, when the third text corresponds to "ㅌ, ㅔ, ㅅ, ㅡ, ㅌ, and ㅡ", the processor 220 may index a text in a state where the Korean alphabets separated as "테스트" are combined, into data.

In various embodiments of the disclosure, as described above, for convenience of description, it is omitted that the processor 220 further performs an operation of combining the separate Korean alphabets of the at least one third text in a second language before the indexing operation is performed, when the second language is Korean. Accordingly, in various embodiments of the disclosure, it may be understood that a text in Korean is output while being separated and is combined before the indexing operation is performed, even when a text having the combined state is described for a Korean text output from the machine learning model.

According to an embodiment, the processor 220 may store an index of data generated by performing the indexing operation in index information. According to an embodiment, the memory 230 may store the index information.

According to an embodiment, only when the electronic device 201 operates the dictionary (e.g., a transliteration dictionary or caching dictionary) together with the machine learning model and the translation pair corresponding to the text extracted from the data is not included in the dictionary, the electronic device 201 may operate the machine learning model. Accordingly, the electronic device 201 may efficiently perform an indexing operation for transliterated search, and may reduce latency by the machine learning model.

According to an embodiment, when the transliteration pair corresponding to the text extracted from the data is not included in the abbreviation dictionary and is not included in the caching dictionary, the electronic device 201 may operate the machine learning model. Accordingly, the electronic device 201 may significantly reduce the number of cases where the machine learning model is operated, thereby increasing the efficiency of an indexing operation.

According to an embodiment, a method of pronouncing a text in abbreviations may be different from a method of pronouncing a text other than abbreviations. According to an embodiment, a transliteration output by inputting abbreviations into the machine learning model may be different from a transliteration according to a method of pronouncing abbreviations. According to an embodiment, when executing a translated search by using an abbreviation as a keyword by operating an abbreviation dictionary together with the machine learning model, the electronic device 201 may improve the accuracy of a search.

Hereinafter, an operation of the machine learning model of an electronic device according to an embodiment will be described with reference to FIG. 3.

Figure 3:
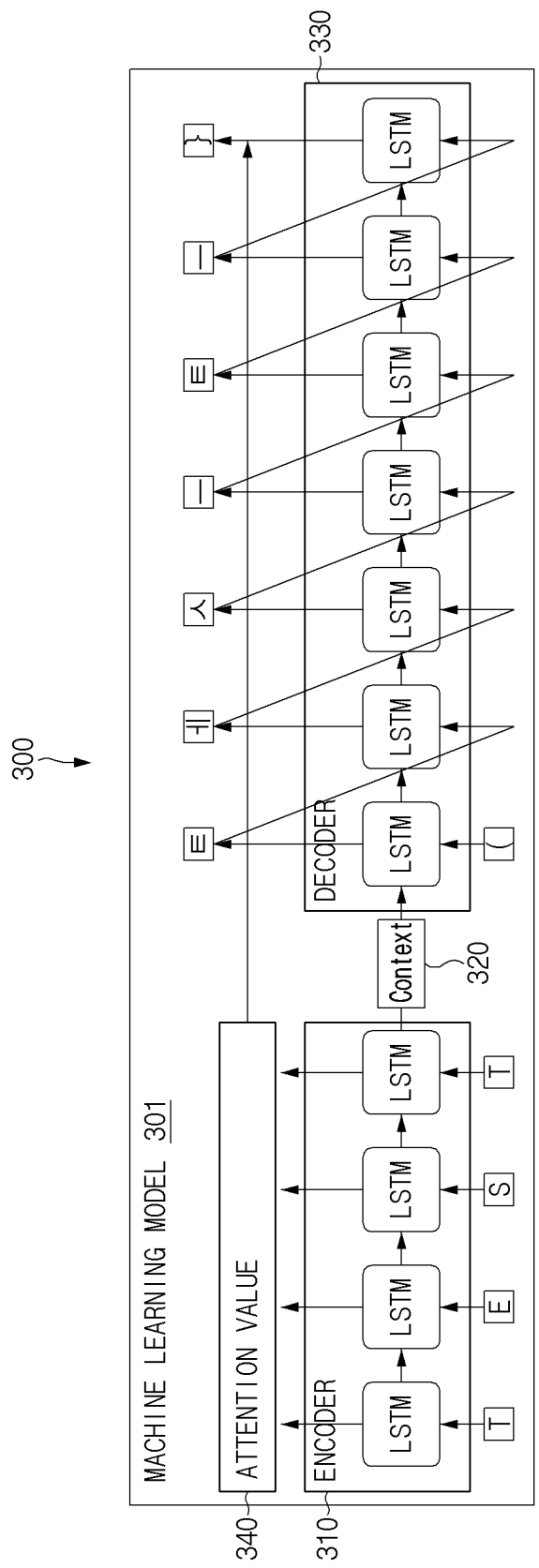
FIG. 3 is a diagram illustrating a machine learning model of an electronic device, according to an embodiment.

FIG. 3 is a diagram 300 illustrating a machine learning model of an electronic device, according to an embodiment. An operation of a machine learning model 301 described below may be performed by an electronic device (e.g., the electronic device 201 in FIG. 2) or a processor (e.g., the processor 220 in FIG. 2).

According to various embodiments, the machine learning model 301 may be various models that output a sequence of another domain from an input sequence. According to an embodiment, the machine learning model 301 may be a sequence-to-sequence (seq2seq) model. For example, the machine learning model 301 may receive a text in a first language and may output a text in a second language.

Referring to FIG. 3, the machine learning model 301 may include an encoder 310 and a decoder 330. According to an embodiment, the encoder 310 may sequentially receive characters of a text in a first language (e.g., English), and then may create a vector by compressing all character information. The created vector may be referred to as a "context vector" 320. According to an embodiment, the encoder 310 may input characters of an input text of a long short term memory (LSTM) cell at each time step. For example, with regard to an input text of "test", the encoder 310 may sequentially input "t", "e", "s", and "t" into the LSTM cell. According to an embodiment, the encoder 310 may transmit the context vector 320 to the decoder 330.

According to an embodiment, the context vector 320 may be in a hidden state of the LSTM cell of the encoder 310 at the last time step. According to an embodiment, the context vector 320 may be used in the first hidden state of the LSTM cell of the decoder 330.

According to an embodiment, the decoder 330 may receive the context vector 320 and may sequentially output characters of a text in the second language (e.g., Korean). According to an embodiment, the decoder 330 may receive a character indicating a start as an initial input. For example, the character indicating a start may be "(", but is not limited thereto.

According to an embodiment, the LSTM cell of the decoder 330 at the first step may predict a character in the second language, which will be input after the initial input character, based on the context vector 320. For example, the LSTM cell of the decoder 330 at the first time step may predict " ㅌ " as the character following "(" based on the context vector 320. According to an embodiment, the LSTM cell of the decoder 330 at any time step (t) may input the predicted character in the second language as an input of the LSTM cell at the next time step (t+1). For example, the LSTM cell of the decoder 330 at the first time step may input " ㅌ " as the input of the LSTM cell of the second time step.

According to an embodiment, the decoder 330 may repeatedly predict the next character until a character indicating the end of the text is output. When the character indicating the end of the text is output, the decoder 330 may terminate prediction. For example, the character indicating an end may be ")", but is not limited thereto.

According to an embodiment, the machine learning model 301 may perform an attention mechanism to compensate for the information loss of the seq2seq model. According to an embodiment, the attention mechanism may refer to a mechanism that references the output of the encoder 310 at all-time steps when the machine learning model 301 outputs a character a specific time step of the decoder 330. According to an embodiment, the machine learning model 301 may differently refer to the output of the encoder 310 at each time step based on the correlation (or similarity) between the output of the decoder 330 at a specific time step and the output of the encoder 310 at each time step.

For example, the attention mechanism may be a dot-product attention mechanism. According to an embodiment, an attention score of the dot-product attention mechanism may mean a value obtained by the dot product between a vector indicating a hidden state of the encoder 310 at each time step and a vector indicating a hidden state of the decoder 330 at a specific time step by using the machine learning model 301.

According to an embodiment, the machine learning model 301 may deliver an attention value 340, which is a final result value obtained by combining pieces of information calculated through an attention mechanism including an attention score, to the decoder 330. According to an embodiment, the decoder 330 may perform a prediction operation by using the attention value 340.

According to an embodiment, the machine learning model 301 may perform the attention mechanism, thereby improving the accuracy of the output (e.g., a predicted value) of the decoder 330 at each time step.

In the above-described embodiment, the testing operation of the machine learning model 301 is described. The training operation of the machine learning model 301 may be performed differently. According to an embodiment, when the machine learning model 301 is trained, the decoder 330 may receive a correct answer as well as the context vector 320 transmitted from the encoder 310. According to an embodiment, the correct answer may mean an input/output pair indicating that a text transliterated into a second language is output when a text in the first language is entered. For example, during the training of the machine learning model 301, the decoder 330 may receive the correct answer indicating that " ㅌㅔㅅㅡㅌㅡ " is needed to be output when the context vector 320 and "test" are entered.

According to an embodiment, the training of the machine learning model 301 may be performed by an electronic device (e.g., the electronic device 104 in FIG. 1 or the server 108 in FIG. 1) or a processor (e.g., the processor 220 in FIG. 2). For example, the training of the machine learning model 301 may be performed by an intelligent server (e.g., a server 1102 of FIG. 11).

Hereinafter, configurations and operations of a software module of an electronic device according to an embodiment will be described with reference to FIGS. 4 to 6.

Figure 4:
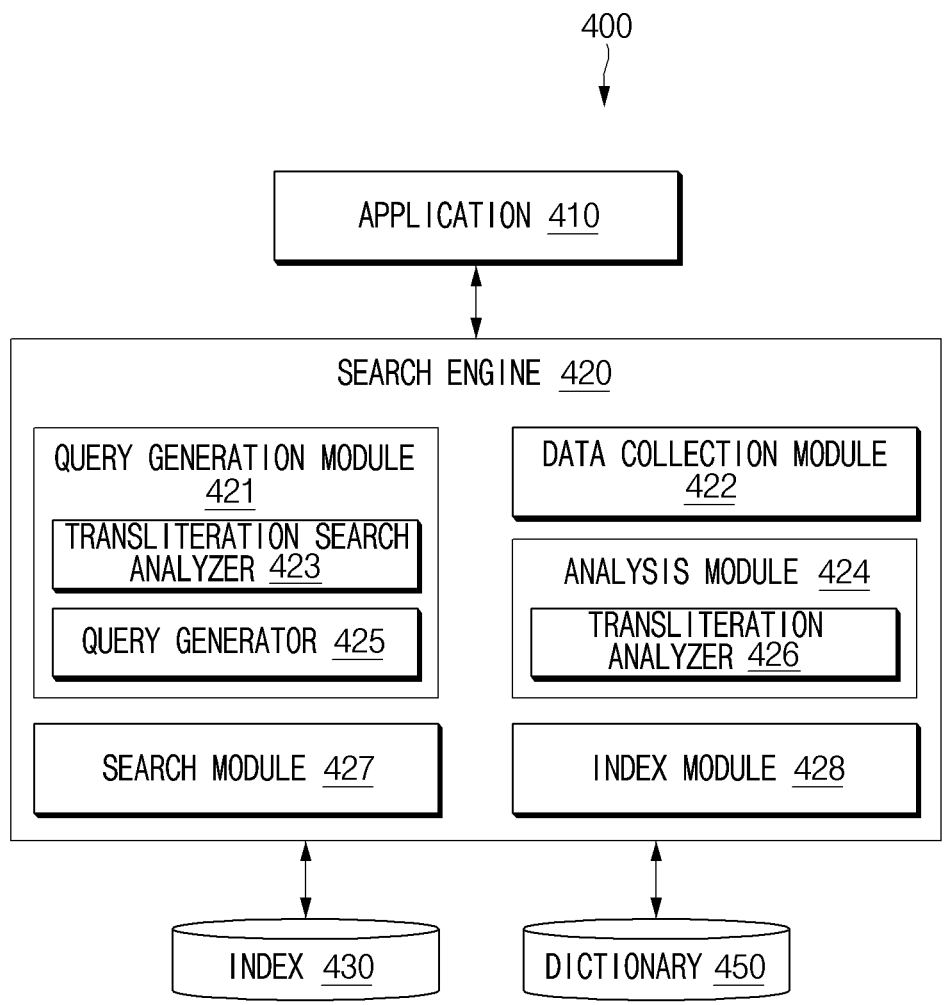
FIG. 4 is a block diagram illustrating an example of a software module of an electronic device, according to an embodiment.

FIG. 4 is a block diagram 400 illustrating an example of a software module of an electronic device, according to an embodiment. FIG. 5 is a diagram 500 for describing an indexing method of an electronic device, according to an exemplary embodiment. FIG. 5 is a diagram for describing in detail an operation of an index module 428 of FIG. 4, according to an embodiment. FIG. 6 is a diagram 600 for describing a method in which an electronic device searches for data, according to an embodiment. FIG. 6 is a diagram for describing in detail an operation of a search module 427 of FIG. 4, according to an embodiment.

A software module shown in FIG. 4 may include a search engine 420 for searching for data stored in a memory (e.g., the memory 230 of FIG. 2) of an electronic device (e.g., the electronic device 201 in FIG. 2). An operation of the search engine 420 described below may be performed by the electronic device or a processor (e.g., the processor 220 of FIG. 2) of the electronic device.

According to an embodiment, the search engine 420 may include a query generation module 421, a search module 427, a data collection module 422, an analysis module 424, and an index module 428. According to an embodiment, the search engine 420 may search an index 430 based on keywords received from an application 410 through the query generation module 421 and the search module 427, and return the search result (e.g., data) to the application 410. According to an embodiment, the search engine 420 may index at least one text including a text extracted from data in the data collected from the application 410 through the data collection module 422, the analysis module 424, and the index module 428, and may store the indexing result in the index 430.

According to an embodiment, the data collection module 422 may collect data to be indexed from the at least one application 410 stored in a memory. For example, the application 410 may be an application such as a photo gallery application, a contact application, a search application, or a note application, but is not limited thereto.

According to an embodiment, the data collection module 422 may collect added data, changed data, or deleted data. For example, when a new application (e.g., Play 스토어) is installed, the data collection module 422 may collect at least one of a title, an English title, a package name, or a category name. For another example, when a new photo is saved, the data collection module 422 may collect at least one of a file name of the photo and an address of a location where the photo was taken. For still another example, when the name of the saved contact is changed, the data collection module 422 may collect the changed name.

According to an embodiment, data, which is to be indexed and which is collected by the data collection module 422, may include text data. According to an embodiment, the data collection module 422 may extract a text to be indexed into content data (e.g., a photo, a video, a contact, an application, or a note) from the content data.

According to an embodiment, the analysis module 424 may analyze a text extracted by the data collection module 422 to create a text list to be indexed to the index 430. According to an embodiment, the analysis module 424 may pre-process the extracted text. For example, the analysis module 424 may tokenize or cleanse the extracted text. The pre-processing operation is described in detail in the description of FIG. 2, and thus a detailed description thereof will be omitted.

According to an embodiment, the analysis module 424 may include a transliteration analyzer 426. For example, the transliteration analyzer 426 may generate at least one text obtained by transliterating the pre-processed text.

Figure 5:
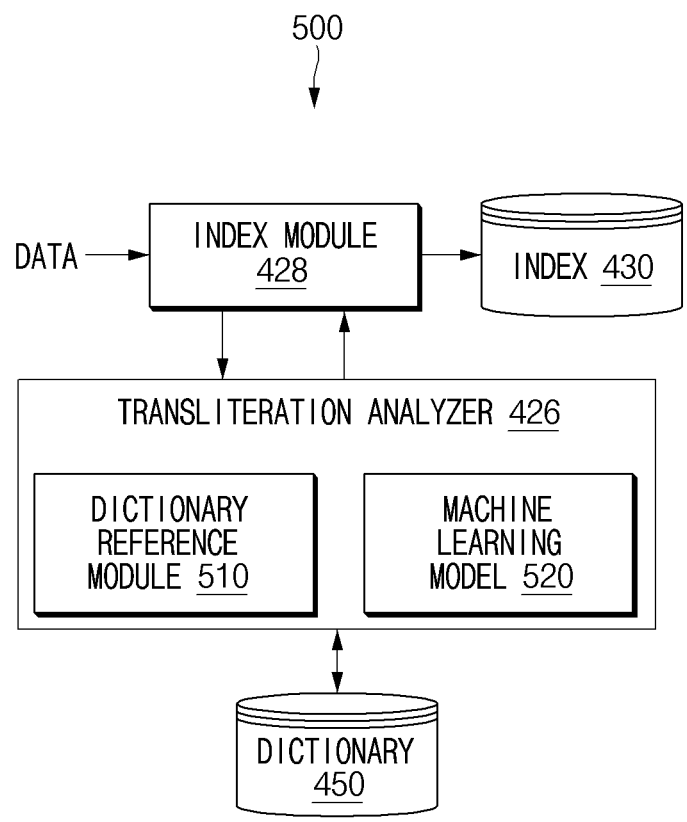
FIG. 5 is a diagram for describing an indexing method of an electronic device, according to an exemplary embodiment.

Referring to FIG. 5, the transliteration analyzer 426 may include a dictionary reference module 510 and a machine learning model 520 (e.g., the machine learning model 301 of FIG. 3).

According to an embodiment, the dictionary reference module 510 may determine whether a transliteration pair including a first text in a first language, which is extracted from data, and at least one second text in a second language corresponding to the first text is included in a dictionary 450. According to one or more embodiments described herein, when identifying a first transliteration pair included in a transliteration dictionary through the dictionary reference module 510 or identifying a second transliteration pair included in a caching dictionary, the transliteration analyzer 426 may obtain at least one second text included in the first transliteration pair or the second transliteration pair without operating the machine learning model 520.

According to an embodiment, where the first transliteration pair or the second transliteration pair is not identified through the dictionary reference module 510, the transliteration analyzer 426 may input a first text in a first language, which is extracted from data, into the machine learning model 520 and then may output at least one third text in a second language.

According to an embodiment, the index module 428 may index a text list, which is to be indexed and which is generated by the analysis module 424, and may store the result in the index 430. The index 430 may mean storage that is stored in the memory of the electronic device and used to store index information referenced upon searching for data.

For example, when a new application (e.g., Play 스토어) is installed, the data collection module 422 may extract "Play 스토어." The analysis module 424 may tokenize "Play 스토어" into "Play" and "스토어" based on a language change. The transliteration analyzer 426 may determine whether a transliteration pair (e.g., ("Play", "플레이")) including "Play" in the first language (e.g., English) and "플레이" in the second language (e.g., Korean) corresponding to "Play" is included in a dictionary (e.g., the dictionary 450). As identifying ("Play", "플레이"), the index module 428 may index "Play" and "플레이" into a 'Play 스토어' application and may store the indexing result in the index 430. As ("Play", "플레이") is not identified, the transliteration analyzer 426 may output "플레이" by inputting "Play" into a machine learning model (e.g., the machine learning module 520), and the index module 428 may index "Play" and "플레이" into the 'Play 스토어' application and may store the indexing result in the index 430.

According to an embodiment, as "스토어" is in the second language (e.g., Korean), the analysis module 424 may or may not perform an operation of the transliteration analyzer 426 described above on "스토어".

According to various embodiments, the analysis module 424 may create "플레이스토어" by merging "플레이," which is obtained by transliterating "Play" in the second language (e.g., Korean), and "스토어" in the second language (e.g., Korean) at the time of extraction from data, and the index module 428 may index "플레이스토어" as well as "Play" and "플레이" in the 'Play 스토어' application and may store the indexing result in the index 430.

According to various embodiments, the transliteration analyzer 426 may further include a machine learning model 520 that transliterates an input text in the second language into an input text in the first language. The analysis module 424 may output "store" in the first language (e.g., English) by inputting "스토어" in the second language (e.g., Korean) into the machine learning model. The index module 428 may further index "store" in the first language (e.g., English), and "playstore," which is a text obtained by merging "store" and "play" in the first language (English) at the time of extraction from data. For example, the index module 428 may index "Play," "플레이," "스토어," "store" "플레이스토어," and "playstore" in the 'Play 스토어' application and may store the indexing result in the index 430. According to an embodiment, the query generation module 421 may receive a user's input including a keyword from at least one the application 410 and may generate a query for searching for data. The query generation module 421 may include a transliteration search analyzer 423 and a query generator 425.

According to an embodiment, the transliteration search analyzer 423 may pre-process a keyword received from the application 410. According to an embodiment, the transliteration search analyzer 423 may tokenize the keyword. For example, the transliteration search analyzer 423 may tokenize the keyword based on a white space, punctuation, or other indicator. According to an embodiment, the transliteration search analyzer 423 may apply pronunciation rules of a language of the keyword to the keyword.

According to an embodiment, the query generator 425 may generate a formatted query based on the keyword pre-processed by the transliteration search analyzer 423.

According to an embodiment, the search module 427 may search for data matching the query generated by the query generator 425 from the index 430. According to an embodiment, the search engine 420 may return data found by the search module 427 to the application 410.

For example, the query generation module 421 may receive a keyword of "플레이 스토어" received from the application 410, and the transliterated search analyzer 423 may tokenize "플레이 스토어" into "플레이" and "스토어" and may change "플레이" to "플레이" by applying Korean pronunciation rules to "플레이." For example, the query generator 425 may generate a query for requesting the search for data including the transliterated title of "플레이." The search module 427 may search for data matching the generated query from the index 430, and may return the found data to the application 410.

An embodiment of Korean pronunciation rules will be described later with reference to FIG. 11.

In the above-described embodiment, it is described that the first language is English and the second language is Korean, but it is not limited thereto. For example, the first language and the second language may be languages supported by the electronic device as a user's input language, and it is sufficient as long as the first language and the second language are different languages from each other.

Hereinafter, a method in which an electronic device performs an indexing operation, according to an embodiment will be described with reference to FIG. 7.

Figure 7:
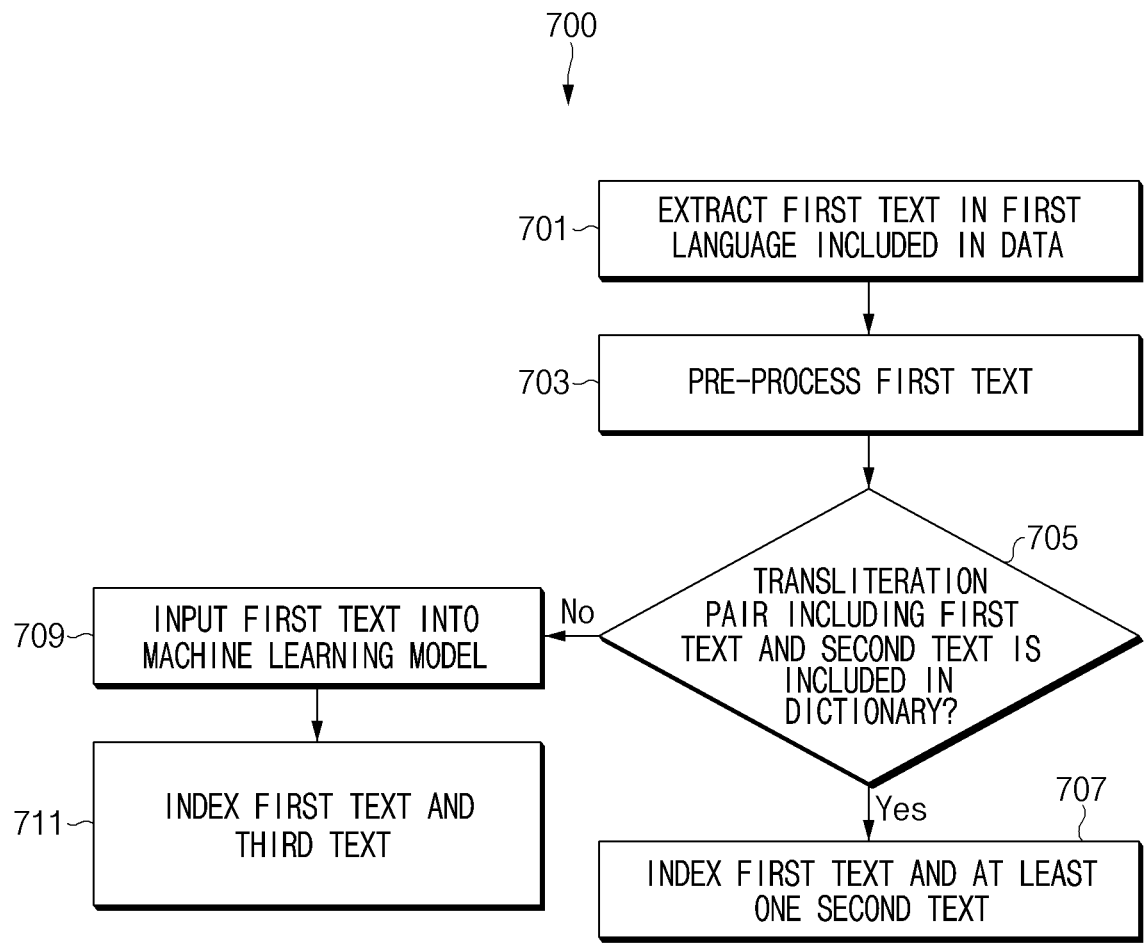
FIG. 7 is a flowchart illustrating a method in which an electronic device performs an indexing operation, according to an embodiment.

FIG. 7 is a flowchart 700 illustrating a method in which an electronic device performs an indexing operation, according to an embodiment. Operations of an electronic device (e.g., the electronic device 201 of FIG. 2) described below may be performed by a processor (e.g., the processor 220 of FIG. 2) of the electronic device.

According to an embodiment, in operation 701, the electronic device may extract a first text in a first language included in data. According to an embodiment, the electronic device may collect data from at least one application stored in a memory (e.g., the memory 230 of FIG. 2). According to an embodiment, as the text to be indexed, the electronic device may extract the first text in the first language included in the collected data. For example, the electronic device may collect data about a newly saved photo from a photo gallery application, and may extract the first text (e.g., "New York") in the first language (e.g., English), which is the location where the photo was taken, as a text to be indexed.

According to an embodiment, in operation 703, the electronic device may pre-process the first text. According to an embodiment, the electronic device may tokenize (or separate) the first text into portions. For example, the electronic device may tokenize the first text based on a white space, punctuation, or other indicator. For example, the electronic device may tokenize "New York" into "New" and "York." According to an embodiment, the electronic device may cleanse the first text by removing at least one of invalid special characters, stop words, or accents from the first text. For example, an electronic device may remove "." from "Mr."

According to an embodiment, in operation 705, the electronic device may determine whether a transliteration pair including a first text and a second text is included in a dictionary (e.g., the dictionary 450 of FIG. 4). For example, the electronic device may determine whether a transliteration pair including the first text and at least one second text in a second language corresponding to the first text is included in the dictionary. As described above, the dictionary may include a transliteration dictionary and/or a caching dictionary. According to an embodiment, responsive to identifying the transliteration pair included in the dictionary (operation 705-Yes), the electronic device may perform operation 707. Responsive to not identifying the transliteration pair included in the dictionary (operation 705-No), the electronic device may perform operation 709 and operation 711.

According to an embodiment, in operation 707, an electronic device may index the first text and the at least one second text into data and may store the indexing result in index information. For example, when the first text is "Mr," which is an abbreviation, the electronic device may identify the transliteration pair ("Mr," {"미스터," "엠알"}) in the abbreviation dictionary, and may index "Mr," "미스터," 및 "엠알" into data and may store the indexing result in index information.

According to an embodiment, in operation 709, the electronic device may input the first text into a machine learning model (e.g., the machine learning model 520 of FIG. 5). According to an embodiment, the electronic device may output at least one third text transliterated into a second language by inputting the first text in a first language to the machine learning model. For example, when the first text is "tablet" that is neither an abbreviation nor a caching word, the electronic device may output "티블렛" and/or "태블릿" transliterated in Korean by inputting "tablet" in English to the machine learning model.

According to an embodiment, in operation 711, the electronic device may index the first text and the third text. For example, the electronic device may index the first text and the at least one third text in the second language output in operation 709 into data and may store the indexing result in the index information. For example, when the first text is "tablet" that is neither an abbreviation nor a caching word, the electronic device may index "tablet," "타블렛" and "태블릿" into data and may store the indexing result in the index information as a transliteration pair including "tablet" is not identified in the dictionary.

Hereinafter, a method, in which an electronic device generates a caching dictionary, according to an embodiment will be described with reference to FIG. 8. As described above, the caching dictionary may be a transliteration pair table including a text, which is frequently used (or having a high search frequency or redundancy) or is expected to be used frequently (or having a high search frequency), and the inference result (or an output) of the machine learning model by using the text as an input.

Figure 8:
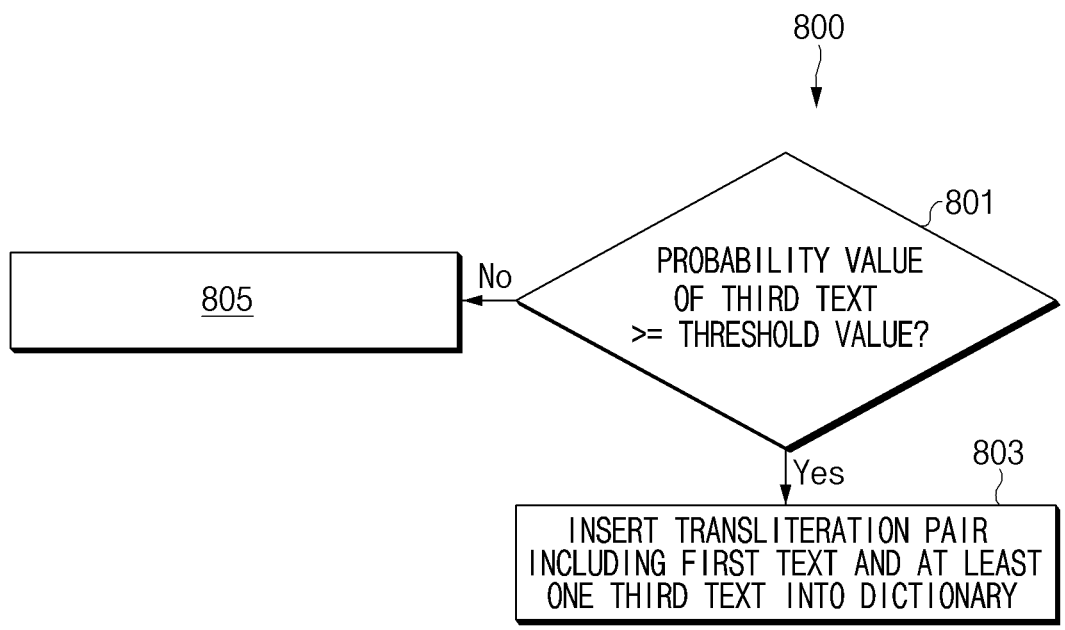
FIG. 8 is a flowchart illustrating a method in which an electronic device generates a caching dictionary, according to an embodiment.

FIG. 8 is a flowchart 800 illustrating a method in which an electronic device generates a caching dictionary, according to an embodiment. Operation 801 and operation 803 shown in FIG. 8 may be performed after operation 711 shown in FIG. 7. Operation 801 and operation 803 shown in FIG. 8 may be included in an indexing operation of an electronic device. Operations of an electronic device (e.g., the electronic device 201 of FIG. 2) described below may be performed by a processor (e.g., the processor 220 of FIG. 2) of the electronic device.

According to an embodiment, in operation 801, the electronic device may determine whether a probability value of a third text is greater than or equal to a threshold value. For example, the electronic device may determine whether the probability value of the at least one third text output from a machine learning model (e.g., the machine learning model 520 of FIG. 5) is greater than or equal to the threshold value. The probability value of the third text may mean the probability that the third text is output among output texts of the machine learning model by using the first text as an input. According to an embodiment, responsive to determining that the probability value of at least one third text output from the machine learning model is greater than or equal to the specified threshold value (operation 801-Yes), the electronic device may perform operation 803. Responsive to determining that the probability value of at least one third text output from the machine learning model is less than the specified threshold value, the electronic device may terminate the indexing operation at block 805 (operation 801-No).

According to an embodiment, in operation 803, the electronic device may insert a transliteration pair including the first text and the at least one third text into a dictionary. For example, the electronic device may insert a transliteration pair including the first text, which is an input text of the machine learning model, and the at least one third text, which is the output text of the machine learning model that uses the first text as an input, into the caching dictionary. For example, when the first text is "music," text data of "music" may be frequently used in the electronic device, and thus the electronic device may determine that the probability value of "뮤직" and/or "무직" is greater than or equal to the threshold value, by inputting an input frequency of "music" input to the machine learning model, or "music" to the machine learning model. The electronic device may insert a transliteration pair ("music," {"뮤직," "무직"}) into the caching dictionary.

According to an embodiment, as the electronic device extracts the first text after performing operation 803, the electronic device may perform operation 701 to operation 705. In operation 705, the electronic device may identify the transliteration pair including the first text and the at least one second text, which is obtained by transliterating the first text, in the caching dictionary. As identifying the transliteration pair, the electronic device may perform operation 707. In operation 707, the electronic device may index the first text and at least one second text, which are included in the transliteration pair, into data and store the indexing result in index information.

According to an embodiment, the electronic device may insert a transliteration pair corresponding to a text that is frequently used in the electronic device into the caching dictionary. The same text as the input text of the inserted transliteration pair is extracted again. In this case, the electronic device may identify a text transliterated from the transliteration pair included in the dictionary without operating the machine learning model. Accordingly, the electronic device may quickly perform an indexing operation and may efficiently operate the machine learning model.

Hereinafter, a method, in which an electronic device indexes a text including a specified pattern, according to an embodiment will be described with reference to FIG. 9.

Figure 9:
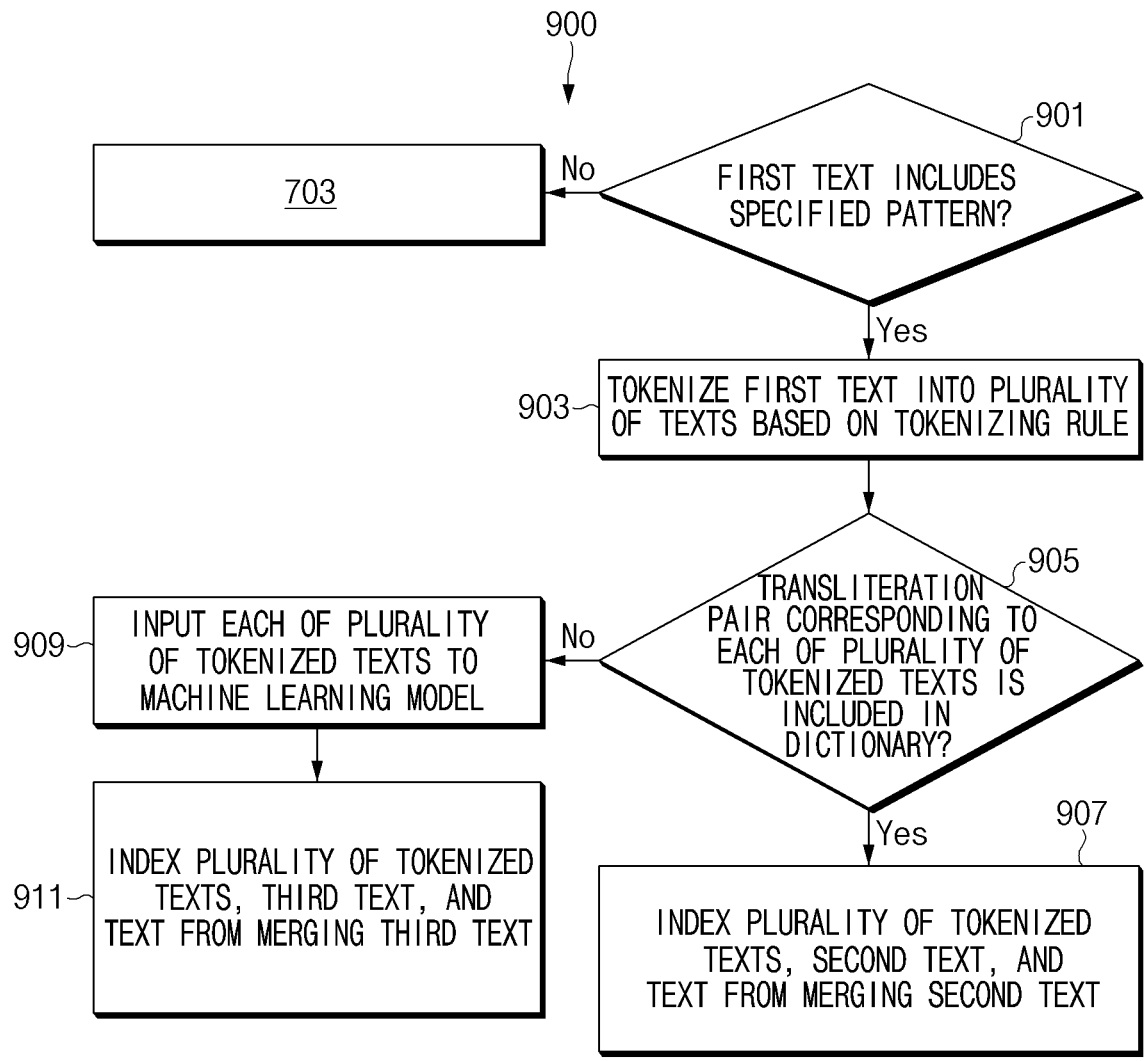
FIG. 9 is a flowchart illustrating a method in which an electronic device performs an indexing operation, according to an embodiment.

FIG. 9 is a flowchart 900 illustrating a method in which an electronic device performs an indexing operation, according to an embodiment. Operation 901 to operation 911 shown in FIG. 9 may be performed after operation 701 shown in FIG. 7. Operations of an electronic device (e.g., the electronic device 201 of FIG. 2) described below may be performed by a processor (e.g., the processor 220 of FIG. 2) of the electronic device.

According to an embodiment, before operation 901, the electronic device may extract a first text in a first language included in data (in operation 701). Operation 701 is described above in the description of FIG. 7; accordingly, redundant description will be omitted.

According to an embodiment, in operation 901, the electronic device may determine whether the first text includes a specified pattern. The specified pattern may mean a character pattern capable of being tokenized into a plurality of texts depending on a tokenizing rule. For example, the specified pattern may include a white space or a special character (e.g., -(hyphen), _(underscore), .(dot), or '(apostrophe)). For example, as identifying the white space in the first text (operation 901-Yes), the electronic device may perform operation 903. Responsive to the white space not being identified in the first text (operation 901-No), the electronic device may operate depending on the indexing process shown in FIG. 7.

According to an embodiment, in operation 903, the electronic device may tokenize the first text into a plurality of texts based on the tokenizing rule. For example, the electronic device may tokenize the first text into the plurality of texts based on the tokenizing rule corresponding to the specified pattern. For example, the electronic device may tokenize the first text into a plurality of texts based on the specified pattern. For example, when the first text includes a white space, the electronic device may tokenize the first text into a plurality of texts based on the white space. For example, when the first text is "New York," the electronic device may determine that the first text includes a white space, and may tokenize the first text into "New" and "York." For another example, when the first text includes '-'(hyphen), the electronic device may tokenize the first text into a plurality of texts based on the hyphen. For example, when the first text is "To-Do," the electronic device may determine that the first text includes a hyphen, and may tokenize the first text into "To" and "Do." According to an embodiment, operation 903 may correspond to the pre-processing operation of operation 703 of FIG. 7. According to an embodiment, operation 901 and operation 903 may be performed when operation 703 of FIG. 7 is performed.

According to an embodiment, in operation 905, the electronic device may determine whether a transliteration pair corresponding to each of a plurality of tokenized texts is included in a dictionary (e.g., the dictionary 450). For example, the electronic device may determine whether a transliteration pair corresponding to "New" is included in the dictionary, and may determine whether a transliteration pair corresponding to "York" is included in the dictionary. For example, the transliteration pair corresponding to "New" may be ("New," "뉴"), and the transliteration pair corresponding to "York" may be ("York," "욕"), but is not limited thereto.

According to an embodiment, as the electronic device identifies a transliteration pair corresponding to the tokenized text (operation 905-Yes), the electronic device may perform operation 907. As the transliteration pair corresponding to the tokenized text is not identified (operation 905-No), the electronic device may perform operation 909 and operation 911.

According to an embodiment, in operation 907, the electronic device may index a plurality of tokenized texts, a second text, and a text from merging the second text. For example, the electronic device may index a plurality of tokenized texts, at least one second text corresponding to each of the plurality of tokenized texts, and a text from merging the at least one second text into data, and may store the indexing result in index information. For example, as identifying both the transliteration pair corresponding to "New" and the transliteration pair corresponding to "York," the electronic device may index "New" and "York" that are a plurality of tokenized texts, "뉴" and "욕" that are at least one second text corresponding to each of the plurality of tokenized texts, and "뉴욕" that a text from merging the at least one second text into data and may store the indexing result in index information.

According to an embodiment, in operation 909, the electronic device may input each of a plurality of tokenized texts to a machine learning model (e.g., the machine learning model 520). According to an embodiment, the electronic device may output at least one third text transliterated into a second language by inputting each of the plurality of tokenized texts in a first language to a machine learning model. Hereinafter, it will be described that the first language is English and the second language is Korean, but the embodiments described herein are not limited to English and Korean, and other examples are possible. For example, as both the transliteration pair corresponding to the first tokenized text "New" and the transliteration pair corresponding to the second tokenized text "York" are not identified, the electronic device may output "뉴" by inputting "New," which is the first tokenized text, to the machine learning model, and may output "욕" by inputting "York," which is the second tokenized text, to the machine learning model.

According to an embodiment, in operation 911, the electronic device may index a plurality of tokenized texts, a third text, and a text from merging the third text. For example, the electronic device may index a plurality of tokenized texts, at least one third text in the second language output from the machine learning model in operation 909, and a text from merging the at least one third text, and may store the indexing result in index information. For example, the electronic device may index "New" and "York" that are a plurality of tokenized texts, "뉴" and "욕" that correspond to the plurality of tokenized texts and are at least one third text in the second language output from the machine learning model, and "뉴욕" that is a text from merging the at least one third text, into data and may store the indexing result in index information.

According to various embodiments, as differently determining whether a transliteration pair corresponding to each of a plurality of tokenized texts is included in the dictionary, the electronic device may perform different indexing processes on each of the tokenized texts. For example, as identifying a transliteration pair corresponding to a first tokenized text in a dictionary, the electronic device may identify at least one text from transliterating the first tokenized text from the transliteration pair. As a transliteration pair corresponding to a second tokenized text is not identified in the dictionary, the electronic device may identify at least one text output by inputting the second tokenized text to a machine learning model (e.g., the machine learning model 520 of FIG. 5) as at least one text from transliterating the second tokenized text.

For example, as identifying the transliteration pair corresponding to "New" in the dictionary, the electronic device may perform operation 907 on "New." As the transliteration pair corresponding to "York" is not identified in the dictionary, the electronic device may perform operation 909 and operation 911 on "York." According to an embodiment, the electronic device may identify "뉴," which is a text obtained by transliterating "New" from a transliteration pair ("New," "뉴") included in the dictionary. The electronic device may identify "욕," which is a text obtained by transliterating "York" into a second language, by inputting "York" to the machine learning model.

For example, the electronic device may index "New" that is the first tokenized text and "York" that is the second tokenized text, "뉴" that is at least one second text corresponding to the first tokenized text, and "욕" that is at least one third text output by inputting the second tokenized text to the machine learning model, and "뉴욕" obtained by merging "뉴," which is at least one second text corresponding to the first tokenized text, and "욕," which is at least one third text output by inputting the second tokenized text to the machine learning model, into data and may store the indexing result in index information.

Hereinafter, a method, in which an electronic device according to an embodiment indexes a text including a plurality of languages, will be described with reference to FIG. 10.

Figure 10:
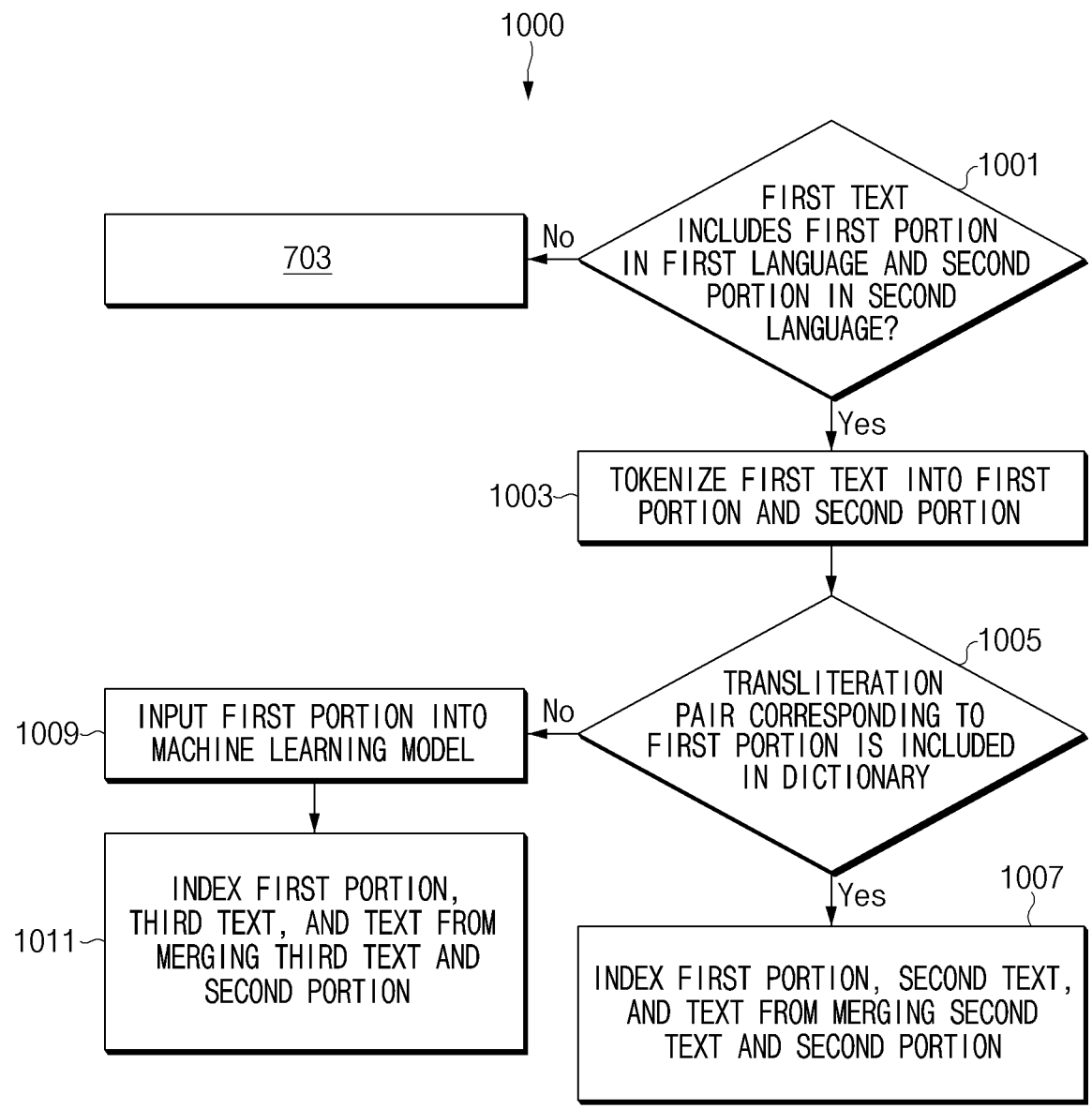
FIG. 10 is a flowchart illustrating a method in which an electronic device performs an indexing operation, according to an embodiment.

FIG. 10 is a flowchart 1000 illustrating a method in which an electronic device performs an indexing operation, according to an embodiment. Operation 1001 to operation 1011 shown in FIG. 10 may be performed after operation 701 shown in FIG. 7. Operations of an electronic device (e.g., the electronic device 201 of FIG. 2) described below may be performed by a processor (e.g., the processor 220 of FIG. 2) of the electronic device.

According to an embodiment, before operation 1001, the electronic device may extract a first text in a first language included in data (in operation 701). Operation 701 is described above in the description of FIG. 7, redundant description will be omitted.

According to an embodiment, in operation 1001, the electronic device may determine whether a first text includes a first portion in a first language and a second portion in a second language. According to an embodiment, responsive to determining that the first text is composed of a plurality of languages (e.g., a first language and a second language) (operation 1001-Yes), the electronic device may perform operation 1003. Responsive to determining that the first text is composed of a single language (e.g., the first language) (operation 1001-No), the electronic device may operate depending on the indexing process shown in FIG. 7.

According to an embodiment, in operation 1003, the electronic device may tokenize the first text into a first portion and a second portion. For example, the electronic device may tokenize the first text into the first portion in the first language and the second portion in the second language based on a language change. Hereinafter, it will be described that the first language is English and the second language is Korean. For example, when the first text is "Play 스토어," the electronic device may determine that the first text is composed of a plurality of languages (e.g., the first language and the second language), and may tokenize the first text into "Play" in the first language and "스토어" in the second language. According to an embodiment, operation 1003 may correspond to the pre-processing operation of operation 703 of FIG. 7. According to an embodiment, operation 1001 and operation 1003 may be performed when operation 703 of FIG. 7 is performed.

According to an embodiment, in operation 1005, the electronic device may determine whether a transliteration pair corresponding to the first portion is included in a dictionary. For example, the electronic device may determine whether the transliteration pair corresponding to "Play" is included in the dictionary. For example, the transliteration pair corresponding to "Play" may be ("Play," "플레이"), but is not limited thereto.

According to an embodiment, as identifying the transliteration pair corresponding to the first portion (operation 1005-Yes), the electronic device may perform operation 1007. As the transliteration pair corresponding to the first portion is not identified (operation 1005-No), the electronic device may perform operation 1009 and operation 1011.

In operation 1007, the electronic device may index the first portion, a second text, and a text from merging the second text and the second portion. For example, the electronic device may index the first portion, at least one second text corresponding to the first portion, and a text from merging the at least one second text and the second portion into data and may store the indexing result in index information. For example, as identifying a transliteration pair corresponding to "Play" in the dictionary, the electronic device may index "Play" that is the first portion, "플레이" that is at least one second text corresponding to the first portion, and "플레이스토어" that is a text from merging the at least one second text "플레이" and the second portion "스토어" into data and may store the indexing result in index information.

According to an embodiment, in operation 1009, the electronic device may input the first portion into the machine learning model. According to an embodiment, the electronic device may output at least one third text transliterated into a second language by inputting the first portion in the first language to the machine learning model. For example, as the transliteration pair corresponding to "Play," which is the first portion, is not identified, the electronic device may output "플레이" by inputting "Play," which is the first portion, to the machine learning model.

According to an embodiment, in operation 1011, the electronic device may index the first portion, the third text, and a text from merging the third text and the second portion. For example, the electronic device may index the first portion, the at least one third text in the second language output from the machine learning model in operation 1009, and a text from merging the at least one third text and the second portion and may store the indexing result in index information. For example, the electronic device may index "Play" that is the first portion, "Play" that corresponds to the first portion and is at least one third text in the second language output from the machine learning model, and "플레이스토어" that is a text from merging at least one third text, "플레이" and the second portion, "스토어" into data and may store the indexing result in index information.

Hereinafter, a method of learning a machine learning model will be described with reference to FIG. 11.

Figure 11:
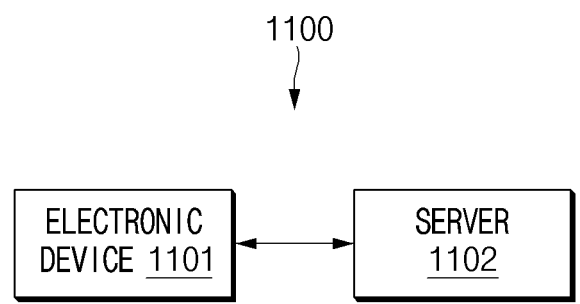
FIG. 11 is a diagram illustrating an electronic device in a network environment, according to an embodiment.

FIG. 11 is a diagram 1100 illustrating an electronic device in a network environment, according to an embodiment. Operations of an electronic device 1101 (e.g., the electronic device 201 in FIG. 2) described below may be performed by a processor (e.g., the processor 220 of FIG. 2) of the electronic device 1101.

Referring to FIG. 11, the electronic device 1101 may communicate with a server 1102 (e.g., the server 108 in FIG. 1). According to an embodiment, the electronic device 1101 may include a communication circuit (e.g., the communication module 190 of FIG. 1), and the communication circuit may communicate with the server 1102 over a network.

According to an embodiment, the server 1102 may be an intelligent server based on an artificial intelligence system, and may train a machine learning model (e.g., the machine learning model 301 in FIG. 3 or the machine learning model 520 in FIG. 5) based on training data. For example, the server 1102 may train the machine learning model based on the training data including an input text in the first language and an output text from transliterating the input text into the second language.

For example, the second language, which is the language of the output text, may be Korean, but is not limited thereto. According to an embodiment, when the second language is Korean, the output text may be obtained through pre-processing by separating consonants and vowels after Korean pronunciation rules are applied.

According to an embodiment, the Korean pronunciation rules may include restricting the number of consonants capable of being positioned at final graphemes and the number of vowels capable of being positioned at final graphemes.

For example, in the case of Korean, one character may consist of one or two consonants and one vowel. For example, Korean characters may be formed by combining a plurality of consonants and vowels. For example, the consonants may include "ㄱ," "ㄴ," "ㄷ," "ㄹ," "ㅁ," "ㅂ," "ㅅ," "ㅇ," "ㅈ," "ㅊ," "ㅋ," "ㅌ," "ㅍ," "ㅎ," "ㄲ," "ㄸ," "ㅃ," "ㅆ," and "ㅉ." The vowels may include "ㅏ," "ㅑ," "ㅓ," "ㅕ," "ㅗ," "ㅛ," "ㅜ," "ㅠ," "ㅡ," "ㅣ," "ㅐ," "ㅒ," "ㅔ," "ㅖ," "ㅘ," "ㅙ," "ㅚ," "ㅝ," "ㅞ," "ㅟ," and "ㅢ." For example, there may be 19 consonants and 21 vowels.

For example, Korean characters may include initial graphemes, middle graphemes, and final graphemes. The initial grapheme means the first sound in the composition of a syllable, and a consonant may be located in the initial grapheme. The middle grapheme means a middle sound in the composition of a syllable, and a vowel may be located in the middle grapheme. The final grapheme means the last sound in the composition of a syllable, and a consonant may be located in the final grapheme.

According to an embodiment, when the language of the output text of the machine learning model is Korean, the server 1102 may reduce the number of consonants capable of being positioned at final graphemes from 19 to 7 by restricting consonants capable of being positioned at final graphemes to "ㄱ," "ㄴ," "ㄷ," "ㄹ," "ㅁ," "ㅂ," and "ㅇ" based on Korean pronunciation rules. Accordingly, the server 1102 may pre-process a Korean text and then may use the pre-processed text as the output text of training data.

According to an embodiment, when the language of the output text of the machine learning model is Korean, the server 1102 may reduce the number of vowels capable of being positioned at middle graphemes from 21 to 18 by replacing "ㅐ" with "ㅔ," replacing "ㅒ" with "ㅖ," and replacing "ᅬ" with "ᅩㅣ" among vowels located in the middle graphemes based on Korean pronunciation rules. Accordingly, the server 1102 may pre-process a Korean text and then may use the pre-processed text as the output text of training data.

According to an embodiment, when the language of the output text of the machine learning model is Korean, the server 1102 may separate the combination of consonant and vowels included in the Korean text. Accordingly, the server 1102 may pre-process a Korean text and then may use the pre-processed text as the output text of training data. For example, the server 1102 may separate "각" into "ㄱ, ㅏ, and ㄱ" and then may use the separated result as the output text of the training data.

For example, the server 1102 may change "베갯잇" to "베겐닏" by applying Korean pronunciation rules, and may separate consonants and vowels of a text as "ㅂ, ㅔ, ㄱ, ㅔ, ㄴ, ㄴ, ㅣ, and ㄷ," Accordingly, the server 1102 may pre-process a Korean text and then may use the pre-processed text as the output text of training data.

According to an embodiment, the server 1102 may reduce the number of cases that the machine learning model performs a prediction operation by applying pronunciation rules of the second language, thereby improving the prediction accuracy and prediction speed of the machine learning model.

According to an embodiment, in the case of Korean, the server 1102 may reduce the number (e.g., about one thousand) of characters (e.g., 가, 갸, 걈, . . . ), in which consonant and a vowel are combined, to the number (e.g., about forty) of consonants (e.g., ㄱ, ㄴ, ㄷ, . . . ) and vowels (e.g., ㅏ, ㅑ, ㅓ, . . . ) through separation of consonants and vowels, thereby lowering the dimensionality of the machine learning model and reducing the size of the model.

According to an embodiment, the server 1102 may include a communication circuit, and the communication circuit may transmit a machine learning model learned based on the above-described training data to the electronic device 1101 over a network.

According to an embodiment, the electronic device 1101 may receive the learned machine learning model, which is transmitted by the server 1102, through a communication circuit (e.g., the communication module 190 in FIG. 1). According to an embodiment, the electronic device 1101 may receive the learned machine learning model from the server 1102 and may operate it by itself.

According to an embodiment, the server 1102 may additionally train the machine learning model based on the added training data and may update the machine learning model. According to an embodiment, the server 1102 may transmit the updated machine learning model to the electronic device 1101 over a network.

Hereinafter, according to an embodiment, a method for an electronic device to update a machine learning model will be described with reference to FIG. 12.

Figure 12:
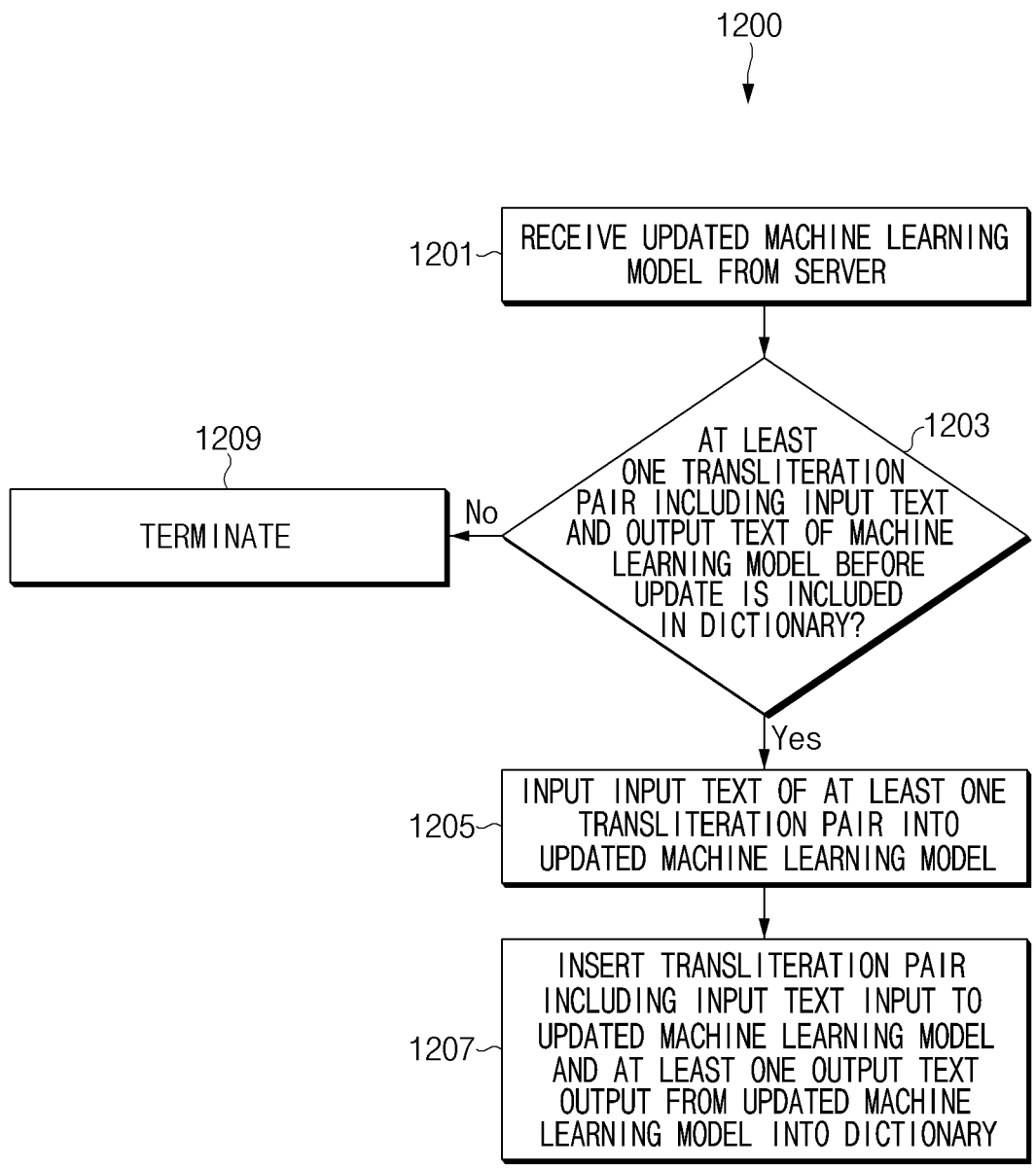
FIG. 12 is a flowchart illustrating a method for an electronic device to update a machine learning model, according to an embodiment.

FIG. 12 is a flowchart 1200 illustrating a method for an electronic device to update a machine learning model, according to an embodiment. Operations of an electronic device (e.g., the electronic device 201 of FIG. 2 or the electronic device 1101 of FIG. 11) described below may be performed by a processor (e.g., the processor 220 of FIG. 2) of the electronic device.

According to an embodiment, in operation 1201, the electronic device may receive an updated machine learning model from a server (e.g., the server 1102 in FIG. 11). Hereinafter, the updated machine learning model may be referred to as a "second machine learning model." For example, the second machine learning model may be additionally trained by a server.

In operation 1203, the electronic device may determine whether at least one transliteration pair including an input text and an output text of the machine learning model before an update is included in a dictionary. For example, the electronic device may determine whether at least one transliteration pair including an input text in a first language and an output text in a second language of the machine learning model before the update is included in the dictionary. For example, the machine learning model before the update may mean a machine learning model pre-stored in a memory (e.g., the memory 230 of FIG. 2) of the electronic device. Hereinafter, the machine learning model before the update may be referred to as a "first machine learning model".

According to an embodiment, determining whether at least one transliteration pair including the input text and the output text of the first machine learning model is included in the dictionary may be determining whether the transliteration pair is present in a caching dictionary stored in the memory (e.g., the memory 230 of FIG. 2). For example, when performing an operation (operation 803 in FIG. 8) of inserting a transliteration pair including a first text in a first language input into the first machine learning model, and at least one third text in the second language output by inputting the first text into the first machine learning model into the dictionary, the electronic device may determine that an input/output pair of the first machine learning model is included in the dictionary. When the electronic device has not previously performed operation 803 of FIG. 8, the electronic device may determine that the input/output pair of the first machine learning model is not included in the dictionary. According to an embodiment, responsive to determining that the input/output pair of the first machine learning model is included in the dictionary (operation 1203-Yes), the electronic device may perform operation 1205. Responsive to determining that the input/output pair of the first machine learning model is not included in the dictionary, the electronic device may terminate an update operation of the machine learning model (operation 1203-No) at block 1209.

According to an embodiment, in operation 1205, the electronic device may input an input text of at least one transliteration pair into the updated machine learning model. According to an embodiment, the electronic device may read out the input text of at least one transliteration pair identified in the caching dictionary. According to an embodiment, the electronic device may input at least one input text thus read out into the second machine learning model received from the server and then may output at least one output text in a second language corresponding to the at least one input text.

According to an embodiment, the electronic device may create a new caching dictionary by deleting an existing caching dictionary and inserting a new transliteration pair including the input text of at least one transliteration pair thus read out and the output text of the second machine learning model corresponding to the input text into the dictionary.

According to another embodiment, when the output text is changed by comparing the output text of the second machine learning model and the output text of the first machine learning model with respect to the same input text, the electronic device may change the output text (the output text of the first machine learning model) included in the transliteration pair corresponding to the input text to the output text of the second machine learning model.

According to an embodiment, in operation 1207, the electronic device may insert a transliteration pair including an input text input to the updated machine learning model and at least one output text output from the updated machine learning model into the dictionary. According to an embodiment, the electronic device may insert a transliteration pair, which includes the input text input into the second machine learning model received from the server and at least one output text that is the newly predicted result value by the second machine learning model, into a dictionary. According to an embodiment, the electronic device may insert a new transliteration pair into the dictionary, and thus a caching dictionary based on the second machine learning model may be newly created. According to another embodiment, when the output text of the second machine learning model is different from the output text of the first machine learning model with respect to the same input text, the electronic device may update the caching dictionary by changing a transliteration pair including an input text and an output text of the first machine learning model into a transliteration pair including an input text and an output text of the second machine learning model.

According to an embodiment, the electronic device may also update the caching dictionary together with the update of the machine learning model, by updating the transliteration pair stored in the existing caching dictionary to the newly result inferred by the updated machine learning model (the second machine learning model).

Figure 6:
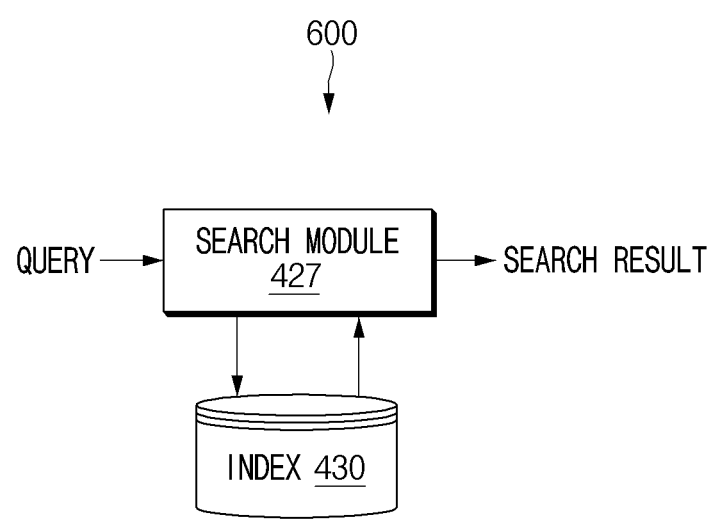
FIG. 6 is a diagram for describing a method in which an electronic device searches for data, according to an embodiment.

According to an embodiment disclosed in the specification, an electronic device (e.g., the electronic device 101 of FIG. 1, the electronic device 201 of FIG. 2, or the electronic device 1101 of FIG. 11) may include at least one processor (e.g., the processor 120 of FIG. 1 of FIG. 1 or the processor 220 of FIG. 2 of FIG. 2) and a memory (e.g., the memory 130 of FIG. 1 or the memory 230 of FIG. 2) operatively connected to the at least one processor and storing a dictionary (e.g., the dictionary 450 of FIGS. 4 and 5) and index information (e.g., the index 430 of FIGS. 4 to 6). The memory may store one or more instructions that, when executed, cause the at least one processor to extract a first text in a first language included in data stored in the memory, to determine whether a transliteration pair including the extracted first text and at least one second text in a second language corresponding to the extracted first text is included in the dictionary, in response to identifying the transliteration pair in the dictionary, to index the first text and the at least one second text into the data so as to be stored in the index information, and, in response to the transliteration pair not being identified in the dictionary, to output at least one third text in the second language by inputting the extracted first text into to a machine learning model (e.g., the machine learning model 301 of FIG. 3 or the machine learning model 520 of FIG. 5), which transliterates an input in the first language into the second language to be outputs, and to index the first text and the output at least one third text into the data to be stored in the index information.

According to an embodiment disclosed in the specification, the dictionary may include a first transliteration pair including a first abbreviation in the first language, and at least one second abbreviation obtained by transliterating the first abbreviation into the second language.

According to an embodiment disclosed in the specification, the instructions may cause the processor to insert a second transliteration pair including the first text and the at least one third text into the dictionary in response to determining that a probability value of the output at least one third text is greater than or equal to a threshold value.

According to an embodiment disclosed in the specification, the instructions may cause the processor to tokenize the first text into a plurality of tokenized texts based on a tokenizing rule corresponding to the specified pattern, and to determine whether the transliteration pair corresponding to each of the plurality of tokenized texts is included in the dictionary before it is determined whether the transliteration pair is included in the dictionary, in response to determining that the extracted first text includes a specified pattern.

According to an embodiment disclosed in the specification, the instructions may cause the processor, in response to identifying the transliteration pair, to index the plurality of tokenized texts, the at least one second text corresponding to each of the plurality of tokenized texts, and a text from merging the at least one second text into the data so as to be stored in the index information, and, in response to the transliteration pair not being identified, to output the at least one third text by inputting each of the plurality of tokenized texts into the machine learning model, and to index the plurality of tokenized texts, the output at least one third text, and a text from merging the output at least one third text into the data so as to be stored in the index information.

According to an embodiment disclosed in the specification, the instructions may cause the processor, before determining whether the transliteration pair is included in the dictionary, in response to determining that the extracted first text includes a first portion in the first language and a second portion in the second language, to tokenize the first text into the first portion and the second portion, and to determine whether the transliteration pair corresponding to the first portion is included in the dictionary.

According to an embodiment disclosed in the specification, the instructions may cause the processor, in response to identifying the transliteration pair, to index the first portion, the at least one second text corresponding to the first portion, and a text from merging the at least one second text and the second portion into the data so as to be stored in the index information, and in response to the transliteration pair not being identified, to output the at least one third text by inputting the first portion into the machine learning model, and to index the first portion, the output at least one third text, and a text from merging the output at least one third text and the second portion into the data so as to be stored in the index information.

According to an embodiment disclosed in the specification, the second language may be Korean, and the at least one third text in the second language may include a plurality of Korean alphabets. The instructions may cause the processor to combine the plurality of Korean alphabets and to index the combined result into the data.

According to an embodiment disclosed in the specification, the memory may further store at least one application. The instructions may cause the processor to receive a keyword in the second language from the at least one application and pre-process the keyword, to generate a query based on the pre-processed keyword, and to search for data corresponding to the generated query from the index information stored in the memory.

According to an embodiment disclosed in the specification, the instructions may cause the processor, in pre-processing the keyword, to tokenize the keyword, and to perform a pre-processing operation by applying a pronunciation rule of the second language.

According to an embodiment disclosed in the specification, the machine learning model may be trained based on training data including an input text in the first language and an output text from transliterating the input text into the second language.

According to an embodiment disclosed in the specification, the second language may be Korean, and the output text may be obtained through pre-processing by separating consonants and vowels after Korean pronunciation rules are applied.

According to an embodiment disclosed in the specification, the Korean pronunciation rules may include restricting the number of consonants capable of being positioned at final graphemes and the number of vowels capable of being positioned at middle graphemes.

According to an embodiment disclosed in the specification, the electronic device may further include a communication circuit that performs a communication connection with a server. The instructions may cause the processor to receive a second machine learning model thus updated from the server through the communication connection and update the first machine learning model stored in the memory.

According to an embodiment disclosed in the specification, the instructions may cause the processor to determine whether at least one third transliteration pair including an input text in the first language input to the first machine learning model, and a first output text in the second language output from the first machine learning model is included in the dictionary, and, in response to identifying the at least one transliteration pair, to output at least one second output text in the second language by inputting the input text into the second machine learning model, and to insert at least one fourth transliteration pair including the input text and the second output text into the dictionary.

According to an embodiment disclosed in the specification, the memory may store the machine learning model.

Moreover, according to an embodiment disclosed in the specification, a method for transliterated search of an electronic device (e.g., the electronic device 101 of FIG. 1, the electronic device 201 of FIG. 2, or the electronic device 1101 of FIG. 11) may include extracting a first text in the first language included in data stored in a memory (e.g., the memory 130 of FIG. 1 or the memory 230 of FIG. 2) of the electronic device, determining whether a transliteration pair including the extracted first text and at least one second text in a second language corresponding to the extracted first text is included in a dictionary (e.g., the dictionary 450 of FIGS. 4 and 5), in response to identifying the transliteration pair in the dictionary, indexing the first text and the at least one second text into the data so as to be stored in index information (e.g., the index 430 of FIGS. 4 to 6), and, in response to the transliteration pair not being identified in the dictionary, outputting at least one third text in the second language by inputting the extracted first text into to a machine learning model (e.g., the machine learning model 301 of FIG. 3 or the machine learning model 520 of FIG. 5) and indexing the first text and the output at least one third text into the data so as to be stored in the index information.

According to an embodiment disclosed in the specification, the dictionary may include a first transliteration pair including a first abbreviation in the first language, and at least one second abbreviation obtained by transliterating the first abbreviation into the second language.

According to an embodiment disclosed in the specification, the method may further include inserting a second transliteration pair including the first text and the at least one third text into the dictionary in response to determining that a probability value of the output at least one third text is greater than or equal to a threshold value.

According to an embodiment disclosed in the specification, the method may further include determining whether the extracted first text includes a specified pattern, before the determining of whether the transliteration pair is included in the dictionary. The determining of whether the transliteration pair is included in the dictionary may include tokenizing the first text into a plurality of tokenized texts based on a tokenizing rule corresponding to the specified pattern, and determining whether the transliteration pair corresponding to each of the plurality of tokenized texts is included in the dictionary. The indexing may include indexing the plurality of tokenized texts, the at least one second text corresponding to each of the plurality of tokenized texts, and a text from merging the at least one second text into the data so as to be stored in the index information in response to identifying the transliteration pair, and outputting the at least one third text by inputting each of the plurality of tokenized texts into the machine learning model, and indexing the plurality of tokenized texts, the output at least one third text, and a text from merging the output at least one third text into the data so as to be stored in the index information in response to the transliteration pair not being identified.

According to an embodiment disclosed in the specification, the method may further include determining that the extracted first text includes a first portion in the first language and a second portion in the second language before the determining of whether the transliteration pair is included in the dictionary. The determining of whether the transliteration pair is included in the dictionary may include tokenizing the first text into the first portion and the second portion, and determining whether the transliteration pair corresponding to the first portion is included in the dictionary. The indexing may include indexing the first portion, the at least one second text corresponding to the first portion, and a text from merging the at least one second text and the second portion into the data so as to be stored in the index information in response to identifying the transliteration pair, and outputting the at least one third text by inputting the first portion into the machine learning model, and indexing the first portion, the output at least one third text, and a text from merging the output at least one third text and the second portion into the data so as to be stored in the index information in response to the transliteration pair not being identified.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one processor; and
   a memory operatively connected to the at least one processor and configured to store instructions, a dictionary and index information,
   wherein the instructions that, when executed by the at least one processor individually or collectively, cause the electronic device to:
   extract a first text in a first language included in data stored in the memory;
   determine whether a transliteration pair including the extracted first text and at least one second text in a second language corresponding to the extracted first text is included in the dictionary;
   in response to identifying the transliteration pair in the dictionary, index the first text and the at least one second text into the data so as to be stored in the index information;
   in response to the transliteration pair not being identified in the dictionary,
      input the first text into a machine learning model,
      obtain, from the machine learning model, at least one third text in the second language based on the first text,
      index the first text and the at least one third text into the data to be stored in the index information,
   determine whether a frequency at which the first text is input into the electronic device by a user or searched for within the electronic device is greater than or equal to a predetermined frequency threshold,
   based on the determination that the frequency is greater than or equal to the predetermined frequency threshold, determine whether a probability value representing an output probability of the at least one third text obtained from the machine learning model is greater than or equal to a predetermined probability threshold, and
   based on the determination that the probability value is greater than or equal to the predetermined probability threshold, insert a transliteration pair including the first text and the at least one third text into the dictionary.

2. The electronic device of claim 1, wherein the dictionary further includes a first transliteration pair including a first abbreviation in the first language, and at least one second abbreviation obtained by transliterating the first abbreviation into the second language.

3. The electronic device of claim 1, wherein the instructions, when executed by the at least one processor individually or collectively, cause the electronic device to:
   in response to subsequently obtaining the first text, obtain the at least one third text by identifying the second transliteration pair previously stored in the dictionary without inputting the first text into the machine learning model.

4. The electronic device of claim 1, wherein the instructions, when executed by the at least one processor individually or collectively, cause the electronic device to:
before it is determined whether the transliteration pair is included in the dictionary, in response to determining that the extracted first text includes a specified pattern, tokenize the first text into a plurality of tokenized texts based on a tokenizing rule corresponding to the specified pattern, and determine whether the transliteration pair corresponding to each of the plurality of tokenized texts is included in the dictionary;
in response to identifying the transliteration pair, index the plurality of tokenized texts, the at least one second text corresponding to each of the plurality of tokenized texts, and a text from merging the at least one second text into the data so as to be stored in the index information; and
in response to the transliteration pair not being identified, output the at least one third text by inputting each of the plurality of tokenized texts into the machine learning model, and index the plurality of tokenized texts, the at least one third text, and a text from merging the at least one third text into the data so as to be stored in the index information.

5. The electronic device of claim 1, wherein the instructions, when executed by the at least one processor individually or collectively, cause the electronic device to:
before determining whether the transliteration pair is included in the dictionary, in response to determining that the extracted first text includes a first portion in the first language and a second portion in the second language, tokenize the first text into the first portion and the second portion, and determine whether the transliteration pair corresponding to the first portion is included in the dictionary;
in response to identifying the transliteration pair, index the first portion, the at least one second text corresponding to the first portion, and a text from merging the at least one second text and the second portion into the data so as to be stored in the index information; and
in response to the transliteration pair not being identified, output the at least one third text by inputting the first portion into the machine learning model, and index the first portion, the at least one third text, and a text from merging the at least one third text and the second portion into the data so as to be stored in the index information.

6. The electronic device of claim 1, wherein the memory further stores at least one application, and
wherein the instructions, when executed by the at least one processor individually or collectively, cause the electronic device to:
receive a keyword in the second language from the at least one application and pre-process the keyword;
generate a query based on the pre-processed keyword; and
search for data corresponding to the generated query from the index information stored in the memory.

7. The electronic device of claim 6, wherein the instructions, when executed by the at least one processor individually or collectively, cause the electronic device to:
in pre-processing the keyword,
tokenize the keyword; and
perform a pre-processing operation by applying a pronunciation rule of the second language.

8. The electronic device of claim 1, wherein the machine learning model is trained based on training data including an input text in the first language and an output text from transliterating the input text into the second language.

9. The electronic device of claim 1, further comprising:
a communication circuit configured to perform a communication connection with a server,
wherein the instructions, when executed by the at least one processor individually or collectively, cause the electronic device to:
receive a second machine learning model thus updated from the server through the communication connection and update the first machine learning model stored in the memory.

10. The electronic device of claim 9, wherein the instructions, when executed by the at least one processor individually or collectively, cause the electronic device to:
determine whether at least one third transliteration pair including an input text in the first language input to the first machine learning model, and a first output text in the second language output from the first machine learning model is included in the dictionary; and
in response to identifying the at least one transliteration pair, output at least one second output text in the second language by inputting the input text into the second machine learning model, and insert at least one fourth transliteration pair including the input text and the second output text into the dictionary.

11. The electronic device of claim 1,
wherein the second language is Korean,
wherein the at least one third text in the second language includes a plurality of Korean alphabets, and
wherein the instructions, when executed by the at least one processor individually or collectively, cause the electronic device to:
combine the plurality of Korean alphabets; and
index the combined result into the data.

12. The electronic device of claim 8,
wherein the second language is Korean, and
wherein the output text is obtained through pre-processing by separating consonants and vowels after Korean pronunciation rules are applied.

13. The electronic device of claim 12,
wherein the Korean pronunciation rules include restricting the number of consonants capable of being positioned at final graphemes and the number of vowels capable of being positioned at middle graphemes.

14. The electronic device of claim 1,
wherein the memory stores the machine learning model.

15. A method for transliterated search of an electronic device, the method comprising:
extracting a first text in a first language included in data stored in a memory of the electronic device;
determining whether a transliteration pair including the extracted first text and at least one second text in a second language corresponding to the extracted first text is included in a dictionary;
in response to identifying the transliteration pair in the dictionary, indexing the first text and the at least one second text into the data to be stored in index information; and
in response to the transliteration pair not being identified in the dictionary,
inputting the first text into a machine learning model,
obtaining, from the machine learning model, at least one third text in the second language based on the first text,
indexing the first text and the at least one third text into the data so as to be stored in the index information, determining whether a frequency at which the first text is input into the electronic device by a user or searched for within the electronic device is greater than or equal to a predetermined frequency threshold, based on the determination that the frequency is greater than or equal to the predetermined frequency threshold, determining whether a probability value representing an output probability of the at least one third text obtained from the machine learning model is greater than or equal to a predetermined probability threshold, and based on the determination that the probability value is greater than or equal to the predetermined probability threshold, inserting a transliteration pair including the first text and the at least one third text into the dictionary.

16. The method of claim 15, wherein the dictionary further includes a first transliteration pair including a first abbreviation in the first language, and at least one second abbreviation obtained by transliterating the first abbreviation into the second language.

17. The method of claim 15, further comprising:
in response to subsequently obtaining the first text, obtaining the at least one third text by identifying the second transliteration pair previously stored in the dictionary without inputting the first text into the machine learning model.

18. The method of claim 15, further comprising:
before the determining of whether the transliteration pair is included in the dictionary, determining whether the extracted first text includes a specified pattern, wherein the determining of whether the transliteration pair is included in the dictionary includes:
tokenizing the first text into a plurality of tokenized texts based on a tokenizing rule corresponding to the specified pattern; and
determining whether the transliteration pair corresponding to each of the plurality of tokenized texts is included in the dictionary, and wherein the indexing includes:
in response to identifying the transliteration pair, indexing the plurality of tokenized texts, the at least one second text corresponding to each of the plurality of tokenized texts, and a text from merging the at least one second text into the data so as to be stored in the index information; and
in response the transliteration pair not being identified, outputting the at least one third text by inputting each of the plurality of tokenized texts into the machine learning model, and indexing the plurality of tokenized texts, the at least one third text, and a text from merging the at least one third text into the data so as to be stored in the index information.

19. The method of claim 15, further comprising:
before the determining of whether the transliteration pair is included in the dictionary, determining that the extracted first text includes a first portion in the first language and a second portion in the second language, wherein the determining of whether the transliteration pair is included in the dictionary includes:
tokenizing the first text into the first portion and the second portion; and
determining whether the transliteration pair corresponding to the first portion is included in the dictionary, and wherein the indexing includes:
in response to identifying the transliteration pair, indexing the first portion, the at least one second text corresponding to the first portion, and a text from merging the at least one second text and the second portion into the data so as to be stored in the index information; and
in response to the transliteration pair not being identified, outputting the at least one third text by inputting the first portion into the machine learning model, and indexing the first portion, the at least one third text, and a text from merging the at least one third text and the second portion into the data so as to be stored in the index information.

20. A non-transitory computer-readable medium having recorded thereon computer-executable instructions, which when executed, cause an electronic device to execute a method for transliterated search, the method comprising:
extracting a first text in a first language included in data stored in a memory of the electronic device;
determining whether a transliteration pair including the extracted first text and at least one second text in a second language corresponding to the extracted first text is included in a dictionary;
in response to identifying the transliteration pair in the dictionary, indexing the first text and the at least one second text into the data to be stored in index information; and
in response to the transliteration pair not being identified in the dictionary,
inputting the first text into a machine learning model,
obtaining, from the machine learning model, at least one third text in the second language based on the first text,
indexing the first text and the at least one third text into the data so as to be stored in the index information,
determining whether a frequency at which the first text is input into the electronic device by a user or searched for within the electronic device is greater than or equal to a predetermined frequency threshold,
based on the determination that the frequency is greater than or equal to the predetermined frequency threshold, determining whether a probability value representing an output probability of the at least one third text obtained from the machine learning model is greater than or equal to a predetermined probability threshold, and
based on the determination that the probability value is greater than or equal to the predetermined probability threshold, inserting a transliteration pair including the first text and the at least one third text into the dictionary.

* * * * *